US012339759B2

(12) United States Patent
Acharya et al.

(10) Patent No.: US 12,339,759 B2
(45) Date of Patent: Jun. 24, 2025

(54) APPARATUSES, METHODS, AND COMPUTER PROGRAM PRODUCTS FOR CONTEXT-CONSCIOUS SENSOR SIGNATURE PROFILING WITH IMPRESSION ACQUISITION AND SCAVENGING

(71) Applicant: Honeywell International Inc., Charlotte, NC (US)

(72) Inventors: Bhabesh Chandra Acharya, Bangalore (IN); Manu Taranath, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/060,326

(22) Filed: Nov. 30, 2022

(65) Prior Publication Data

US 2024/0176719 A1   May 30, 2024

(51) Int. Cl.
*G06F 11/30*   (2006.01)
*G06F 16/22*   (2019.01)
*G06F 16/25*   (2019.01)

(52) U.S. Cl.
CPC ...... *G06F 11/3089* (2013.01); *G06F 11/3006* (2013.01); *G06F 16/22* (2019.01); *G06F 16/258* (2019.01)

(58) Field of Classification Search
CPC .. G06F 11/3089; G06F 11/3006; G06F 16/22; G06F 16/258
USPC .......................................................... 707/741
See application file for complete search history.

(56) References Cited

U.S. PATENT DOCUMENTS

| | | | | |
|---|---|---|---|---|
| 9,075,844 B1* | 7/2015 | Thayer | ............... | G06F 11/3075 |
| 10,592,525 B1* | 3/2020 | Khante | ............... | G06F 16/258 |
| 10,810,508 B1* | 10/2020 | Maximo | ............... | G06F 16/906 |
| 11,089,107 B1* | 8/2021 | Chor | ............... | H04L 63/08 |
| 11,829,415 B1* | 11/2023 | Batsakis | ............... | G06F 16/953 |

(Continued)

OTHER PUBLICATIONS

Dehkordi, Soroush Abbasian, et al., "A survey on data aggregation techniques in IoT sensor networks", Wireless Networks, vol. 26, Springer Science+Business Media, LLC, Sep. 25, 2019, pp. 1243-1263.*

(Continued)

*Primary Examiner* — Robert Stevens
(74) *Attorney, Agent, or Firm* — ALSTON & BIRD LLP

(57) ABSTRACT

Sensor characteristic profiles for different sensor types for sensors of an operational system are generated based at least in part on aggregated time series sensor data from the sensors and context data for the sensors. The sensor characteristic profiles for each sensor type are stored in a sensor type profile database. Sensor information is generated based at least in part on the stored sensor characteristic profiles. Each of the sensor characteristic profiles comprises sensor type information identifying the sensor type and a sensor data signature for the sensor type. Sample sensor data from a particular sensor is used to determine information about the particular sensor based on the stored sensor characteristic profiles. Device characteristic profiles for different device types and/or virtual sensor characteristic profiles for different virtual sensors defined with respect to particular combinations of the sensors can be generated based on the stored sensor characteristic profiles.

21 Claims, 13 Drawing Sheets

(56) References Cited

U.S. PATENT DOCUMENTS

| | | | | |
|---|---|---|---|---|
| 12,007,738 | B2* | 6/2024 | Wilde | G05B 19/0428 |
| 2012/0197852 | A1* | 8/2012 | Dutta | H04L 67/565 |
| | | | | 707/E17.005 |
| 2012/0197898 | A1* | 8/2012 | Pandey | H04L 67/12 |
| | | | | 707/741 |
| 2012/0197911 | A1* | 8/2012 | Banka | G06F 16/951 |
| | | | | 707/754 |
| 2013/0073576 | A1* | 3/2013 | Lillethun | H04W 4/38 |
| | | | | 707/E17.014 |
| 2014/0232539 | A1* | 8/2014 | Hiruta | G07C 5/08 |
| | | | | 340/438 |
| 2016/0216999 | A1* | 7/2016 | Blount | G01D 18/00 |
| 2017/0289650 | A1* | 10/2017 | Schattmaier | G06N 5/046 |
| 2018/0091559 | A1* | 3/2018 | Luger | H04L 63/145 |
| 2018/0293308 | A1* | 10/2018 | Miller | G06F 16/345 |
| 2019/0095817 | A1* | 3/2019 | Ma | H04L 67/10 |
| 2019/0317947 | A1* | 10/2019 | Xu | G06F 11/3006 |
| 2020/0042626 | A1* | 2/2020 | Curtis | G06F 16/2443 |
| 2020/0044927 | A1* | 2/2020 | Apostolopoulos | |
| | | | | H04L 41/0895 |
| 2021/0027458 | A1* | 1/2021 | Chor | G06V 20/20 |
| 2021/0117857 | A1* | 4/2021 | Sriharsha | G06F 18/2185 |
| 2021/0319633 | A1* | 10/2021 | Korchev | G07C 5/008 |
| 2022/0248168 | A1* | 8/2022 | De Souza Ferraz | H04W 12/06 |

OTHER PUBLICATIONS

Younan, Mina, et al., "Data Reduction Model for Balancing Indexing and Securing Resources in the Internet-of-Things Applications", IEEE Internet of Things Journal, vol. 8, No. 7, Apr. 2021, pp. 367-375.*

Keller, Matthias, et al., "Visualizing Large Sensor Network Data Sets in Space and Time with Vizzly", 7th IEEE International Workshop on Practical Issues in Building Sensor Network Applications 2012, Clearwater, FL, Oct. 22-25, 2012, pp. 925-933.*

Barnaghi, Payam, et al., "Publishing Linked Sensor Data", SSN '10—Proc. of the 3rd International Conf. on Semantic Sensor Networks, vol. 668, Nov. 2010, pp. 1-16.*

Bedogni, Luca, et al., "By Train or by Car? Detecting the User's Motion Type through Smartphone Sensors Data", WD 2012, Dublin, Ireland, Nov. 21-23, 2012, pp. 1-6.*

Ponmagal, R. S., et al., "An Extensible Cloud Architecture Model for Heterogeneous Services", International Journal of Computer Science and Information Security, vol. 1, No. 1, © 2011, pp. 147-155.*

* cited by examiner

APPARATUSES, METHODS, AND COMPUTER PROGRAM PRODUCTS FOR CONTEXT-CONSCIOUS SENSOR SIGNATURE PROFILING WITH IMPRESSION ACQUISITION AND SCAVENGING

TECHNICAL FIELD

Example embodiments of the present invention relate generally to sensors of operational systems, and, more particularly, to sensor signature profiling of sensors of operational systems.

BACKGROUND

Applicant has identified many technical challenges and difficulties associated with current solutions for maintaining and analyzing context metadata for sensors of operational systems. Through applied effort, ingenuity, and innovation, Applicant has solved problems relating to maintaining and analyzing such context metadata, which are described in detail below.

BRIEF SUMMARY

According to one aspect, embodiments of the present invention feature an apparatus comprising at least one processor and at least one non-transitory memory comprising program code. The at least one non-transitory memory and the program code are configured to, with the at least one processor, cause the apparatus to at least receive aggregated time series sensor data and context data for a plurality of sensors of a plurality of different sensor types, generate one or more sensor characteristic profiles for each sensor type of the plurality of different sensor types based at least in part on the aggregated time series sensor data and the context data, store the one or more sensor characteristic profiles for each sensor type in a sensor type profile database, and generate sensor information based at least in part on the stored one or more sensor characteristic profiles. Each of the one or more sensor characteristic profiles comprises sensor type information identifying the sensor type and a sensor data signature for the sensor type.

In some embodiments, the sensor information may include sensor identification information, sensor type information, and/or context data for a particular sensor. Here, the apparatus may be further configured to determine the sensor identification information, sensor type information, and/or context data for the particular sensor based at least in part on sample sensor data from the particular sensor and the stored one or more sensor characteristic profiles, for example, by generating a sample sensor data signature for the particular sensor based at least in part on the sample sensor data from the particular sensor and matching the sample sensor data signature against sensor data signatures of the stored one or more sensor characteristic profiles.

In some embodiments, the apparatus may be further configured to generate the sensor information based at least in part on comparing sensor data signatures of the stored one or more sensor characteristic profiles, the compared sensor data signatures being for similar sensor types of different sensor makes, and evaluating the compared sensor data signatures against each other.

Moreover, in some embodiments, the apparatus may be configured to generate device characteristic profiles for a plurality of devices to which the plurality of sensors are connected based at least in part on the one or more sensor characteristic profiles, the device characteristic profiles comprising device type information identifying a device type and a device profile score for the device type, and/or generate one or more virtual sensor characteristic profiles for one or more virtual sensor types, each of which is defined with respect to a particular combination of different sensor types of the plurality of sensor types, by combining the sensor data signatures of the sensor characteristic profiles for the particular combination of different sensor types.

In some embodiments, the one or more sensor characteristic profiles for each sensor type may include one or more normalized profiles. Here, the apparatus may be further configured to generate the one or more normalized profiles by converting different instances of time series sensor data for different sensors to a common index system.

In some embodiments, the one or more sensor characteristic profiles for each sensor type may include one or more central sensor characteristic profiles, in which case the apparatus may be further configured to generate a central characteristic profile by identifying a time window within which sensor data for sensors of the sensor type is sufficiently representative of the sensor type, extracting sensor data within the identified time window for sensors of the sensor type, and generating the sensor data signature of the central characteristic profile with respect to the extracted sensor data from within the identified time window.

According to another aspect, embodiments of the present invention feature a method comprising, at a device with one or more processors and one or more memories, receiving aggregated time series sensor data and context data for a plurality of sensors of a plurality of different sensor types, generating one or more sensor characteristic profiles for each sensor type of the plurality of different sensor types based at least in part on the aggregated time series sensor data and the context data, wherein each of the one or more sensor characteristic profiles comprises sensor type information identifying the sensor type and a sensor data signature for the sensor type, storing the one or more sensor characteristic profiles for each sensor type in a sensor type profile database, and generating sensor information based at least in part on the stored one or more sensor characteristic profiles.

According to another aspect, embodiments of the present invention feature a computer program product comprising at least one non-transitory computer-readable storage medium having computer-readable program code portions stored therein. The computer-readable program code portions comprise an executable portion configured to: receive aggregated time series sensor data and context data for a plurality of sensors of a plurality of different sensor types; generate one or more sensor characteristic profiles for each sensor type of the plurality of different sensor types based at least in part on the aggregated time series sensor data and the context data, wherein each of the one or more sensor characteristic profiles comprises sensor type information identifying the sensor type and a sensor data signature for the sensor type; store the one or more sensor characteristic profiles for each sensor type in a sensor type profile database; and generate sensor information based at least in part on the stored one or more sensor characteristic profiles.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

The following drawings are illustrations of a particular embodiments of the present disclosure and thereof do not limit the scope or spirit of the present disclosure. The drawings are not necessarily drawn to scale, nor are they necessarily are intended for use in conjunction with the explanation in the following detailed description.

DETAILED DESCRIPTION

Figure 1:
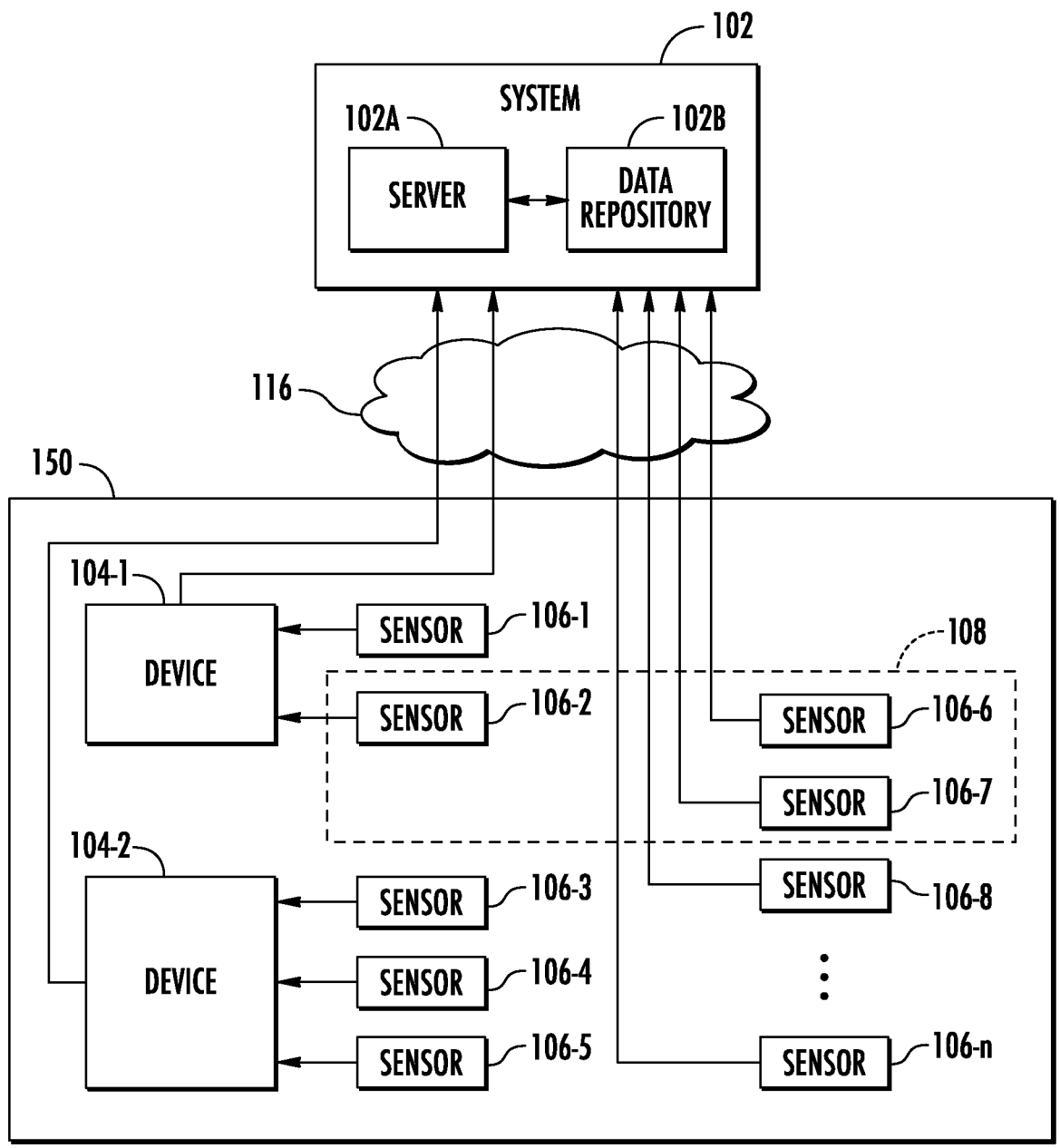
FIG. 1 illustrates a block diagram of a sensor profiling system for performing sensor data monitoring and sensor profiling functionality with respect to a plurality of sensors of one or more operational systems, which may be specially configured within which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Typically, operational systems such as building systems (e.g., heating, ventilation, and air conditioning (HVAC) systems, building automation systems, security systems) and/or industrial systems (e.g., manufacturing systems, sorting and distribution systems), to name a few examples, comprise sensors for monitoring one or more aspects of the operational system and/or environments where the operational systems are deployed. These sensors may be of different sensor types and different sensor makes. In example systems, different aspects of an operational system are individually monitored by operational devices comprising or connected to sensors and configured and deployed throughout the operational system for a functional purpose. For example, a thermostat can monitor a temperature of a building environment to control the functions of an HVAC system in order to maintain a set temperature within a building environment where the HVAC system is installed.

In some operational systems, it has been proposed to communicatively connect one or more operational systems, including operational devices and/or sensors of the operational systems, to a monitoring system (e.g., a cloud platform) configured to aggregate data with respect to all of the operational devices and/or sensors of one or more operational systems (e.g., deployed at one or more premises or environments). In one example, the monitoring system may aggregate and maintain context data or metadata (e.g., relationships, types, locations, roles) and possibly time series sensor data (e.g., sensor values produced by digital or analog sensors at particular instances of time represented by timestamps associated with each of the sensor values) of various sensors of one or more operational systems connected to the monitoring system. This context metadata and sensor data may be archived and consulted in order to provide some visibility into and perform various control operations with respect to the one or more operational systems, to name a few examples.

However, many operational systems are heterogenous with respect to their operational devices and sensors, having devices and sensors of many different makes. For example, sensors of a similar type (e.g., configured to perform the same sensing operation such as detecting ambient air temperature) may have different sensor makes with respect to each other by virtue of having different structures, sensing mechanisms, manufacturers, sensing protocols, communication protocols, and/or versions or dates of manufacture. Such a heterogeneous operational system can present certain challenges for a monitoring system. For sensors and devices of certain makes (e.g., produced by a certain manufacturing entity), a monitoring system may not have access to the same amount and/or types of data. For example, within a heterogeneous operational system, certain sensors or devices may be known to the monitoring system by virtue of the monitoring system having full context data for the sensors or devices (e.g., identification information, type information, relationships, locations, roles) along with sensor data from the sensors or devices. On the other hand, certain sensors or devices may be unknown to the monitoring system by virtue of the monitoring system having access to sensor data from the sensors or devices but limited or no context data.

At the same time, given the aggregated context data and sensor data that is available to the monitoring system, more in depth analysis is possible that could potentially provide valuable overall insights with respect to the various devices and sensors deployed throughout the one or more systems while also allowing monitoring systems to identify unknown sensors and devices. In particular, it is possible to profile central time series signatures and/or impressions of the various sensors in order to discover and/or identify sensors and devices, extract context data and/or metadata for known and unknown sensors, compare and/or evaluate sensors, and/or detect anomalies within the one or more operational systems. Additionally, the more in depth analysis represented by the central time series signatures and/or impressions allows for development of powerful machine learning models configured to generate insights concerning the sensors and more efficient training of machine learning models.

Embodiments of the present disclosure provide for context-conscious sensor signature profiling with impression acquisition and scavenging. In general, aggregated time series sensor data and context data is collected for a plurality of sensors of a plurality of different sensor types. For each sensor type, one or more sensor characteristic profiles are generated based at least in part on the aggregated time series sensor data and the context data. Each of the sensor characteristic profiles comprises sensor type information identifying the sensory type and a sensor data signature for the sensor type. These sensor characteristic profiles for each sensor type are stored in a sensor type profile database. Sensor information is generated based at least in part on the stored sensor characteristic profiles. In one example, for a particular sensor (e.g., an unknown sensor having a known manufacturer but for which there is no other context data), the stored sensor characteristic profiles can be used to perform a search based on sample sensor data from the particular sensor (e.g., a sample central time series signature generated from the sample sensor data) in order to generate sensor information including a sensor type of the particular sensor. In another example, for a particular sensor (e.g., a known sensor having a known manufacturer and known context data), the stored sensor characteristic profiles can be used to perform a search based on sample sense data from the particular sensor in order to generate sensor information including complete sensor metadata and characteristics. In another example, the stored sensor characteristic profiles can be used to discover and/or generate context metadata for sensors. In yet another example, the stored sensor characteristic profiles can be used to compare sensors and sensor data from different sensors, including comparing a sample sensor data signature for a particular sensor with a stored sensor characteristic profile in order to determine whether characteristics evident in the sample sensor data signature are central characteristics for the sensor type of the particular sensor. In yet another example, the stored sensor characteristic profiles may be used to determine and/or monitor seasonality and/or trends of the sensors. In another example, the stored sensor characteristic profiles can be used to generate virtual sensors and verify performance of the virtual sensors (and/or underlying individual physical sensors that form the virtual sensor). Moreover, the stored sensor characteristic profiles may be used in training and/or configuring one or more machine learning models for generating overall insights with respect to the sensors.

FIG. 1 illustrates a block diagram of a sensor profiling system for performing sensor data monitoring and sensor profiling functionality with respect to a plurality of sensors of one or more operational systems 150, which may be specially configured within which embodiments of the present disclosure may operate. Specifically, FIG. 1 depicts a sensor profiling system 102 in communication with an operational system 150, which comprises operational devices 104 and sensors 106.

The operational system 150 and/or the operational devices 104 may include one or more actuators (not illustrated), which may be activated and/or controlled to perform various physical operations of the operational system 150 and/or the operational devices 104.

The operational system 150 may be configured to monitor and/or control various physical aspects of a premises, building, site, location, environment, mechanical system, industrial plant or process, laboratory, manufacturing plant or process, vehicle, and/or utility plant or process, to name a few examples, via the devices 104, the sensors 106, and/or actuators (not illustrated) of the operational system 150. The operational system 150 may include one or more building systems (e.g., heating, ventilation, and air conditioning (HVAC) systems, building automation systems, security systems) and/or industrial systems (e.g., manufacturing systems, sorting and distribution systems). In one example, the operational system 150 may monitor and/or control operation of a residential or commercial building or premises (e.g., HVAC (heating, ventilation, and air conditioning) systems, security systems, building automation systems, and/or the like). In another example context, the operational system 150 may monitor and/or control operation of a manufacturing plant (e.g., manufacturing machinery, conveyor belts, and/or the like). In another example context, the operational system 150 may monitor and/or control operation of a vehicle.

The operational devices 104 and the sensors 106 may be physical components (e.g., implemented at least via hardware) installed, positioned, and/or deployed throughout the operational system 150. In various embodiments, the operational devices 104 may include computing devices for executing instructions (e.g., stored in nonvolatile memory) for performing various functions of the operational system 150, for example, by receiving sensor data from one or more of the sensors 106 and controlling one or more actuators of the operational system 150 (e.g., based on the received sensor data). The operational devices 104 may include field controllers of the operational system 150. In an example context, each of the operational devices 104 embodies a computing device of one or more systems for operation of a residential building (e.g., HVAC (heating, ventilation, and air conditioning) assets, security assets, and/or the like) such as controllers for directing the functionality of actuators such as air handlers, blowers, condensers, chillers, and/or dampers, to list a few examples. In another example context, each of the operational devices 104 embodies a computing device of one or more systems for operation of a manufacturing plant (e.g., HVAC assets, manufacturing machinery, conveyor belts, and/or the like) such as controllers for directing the functionality of actuators such as the manufacturing machinery and/or conveyor belts.

The sensors 106 may be standalone computing devices configured to generate the sensor data based on incorporated sensing elements. The sensors 106 may also include sensing elements incorporated into and/or connected to one or more computing devices, including, for example, the operational devices 104. The sensors 106 may include digital sensors, which generate and transmit digital sensor data based on conditions sensed by sensing elements of the sensors, and/or analog sensors, which produce analog signals based on conditions sensed by sensing elements of the sensors. The sensors 106 may be configured to read and/or otherwise capture certain values associated with a premises, building, site, location, environment, mechanical system, industrial plant or process, laboratory, manufacturing plant or process, and/or utility plant or process, or operations associated therewith or therein. Non-limiting examples of sensors 106 include, without limitation, various sensor types, including temperature sensors, pressure sensors, flow sensors, and/or the like. Each of the sensors 106 may be configured to monitor a value of one or more data properties associated with operation of the operational system 150, including operational devices 104 and/or actuators of the operational system 150. Data values from the sensor 106 may be collected continuously, at set or predefined time intervals (e.g., every minute, every 5 minutes, hourly, and/or the like). In this regard, the sensor 106 may be utilized to collect the values in real-time at one or more desired times. The sensors 106 may be of a plurality of different sensor types, in which sensors 106 of a common sensor type or of similar sensor types are configured to perform the same or similar sensing operations by virtue of monitoring the same or analogous values associated with the operational system 150 and/or serving analogous roles within the operational system 150. For example, sensors 106 of a particular sensor type may all be configured to monitor ambient air temperature. The sensors 106 may be of a plurality of different sensor makes with respect to each other by virtue of having different structures, sensing elements, manufacturers, sensing protocols, communication protocols, and/or versions or dates of manufacture. Sensors 106 of the same or similar sensor types (e.g., all configured to monitor the same or analogous values and/or serve analogous roles within the operational system 150) may be of different sensor makes. For example, the operational system 150 may comprise temperature sensors performing analogous roles with respect to each other (e.g., temperature sensing) that are produced by different manufacturing entities and/or have different structures and/or sensing mechanisms for temperature sensing. In this way, the operational system 150 may be heterogeneous with respect to the different sensors 106 and/or operational devices 104 installed throughout the system 150. Each sensor type of the plurality of different sensor types for the sensors 106 may refer to a determinable electronically managed data value representing identifiable aspects of a sensor 106. Non-limiting examples of a sensor type may include a classification of a sensor 106 based on a general human-assigned classification (e.g., with respect to function or role performed by the sensor 106).

In the illustrated example, a first operational device 104-1 is in communication with a first sensor 106-1 and a second sensor 106-2, while a second operational device 104-2 is in communication with a third sensor 106-3, a fourth sensor 106-4, and a fifth sensor 106-5. In each case, the sensors 106 in communication with the devices 104 may be operated and/or controlled together (e.g., by the devices 104) and/or housed together (e.g., as part of the devices 104).

Also in the illustrated example, a sixth sensor 106-6, seventh sensor 106-7, eighth sensor 106-8, and any number of additional sensors 106-*n* may be standalone sensors and/or sensors that are integrated into and/or in communication with other devices.

The operational system 150 may further comprise various sensors 106 that operate together in conjunction with one another and one or more and/or devices 104 and/or actuators as part of a functional subsystem 108. Generally, the subsystem 108 may include a plurality of components that operate and/or are controlled together, are housed together or separately, or otherwise operate in conjunction with one another. In the illustrated example, the second sensor 106-2, the sixth sensor 106-6, and the seventh sensor 106-7 are depicted as part of the functional subsystem 108.

In some embodiments, the sensor profiling system 102 may be configured to communicate with each of the components of the operational system 150 through direct communication with a particular device of the operational system 150 (e.g., a controller). In other embodiments, for example as depicted, the sensor profiling system 102 may be configured to communicate with each of the components of the operational system 150 over the communications network 116. Moreover, the sensor profiling system 102 may be configured to communicate with the sensors 106 directly or via an intervening operational device 104.

The communications network 116 may embody any of a myriad of network(s) configured to enable communication between two or more computing device(s). In some embodiments, the communications network 116 embodies a private network. For example, the sensor profiling system 102 may be embodied by various computing device(s) on an internal network, such as one or more server(s) of an industrial plant in communication with the various controller(s), devices(s), and/or sensor(s) associated with operating the industrial plant. In some such embodiments, the sensor profiling system 102 is embodied by computing device(s) proximally located to the industrial plant and/or other computing devices to be monitored, for example within the same plant site or other physical, defined location.

In other embodiments, the communications network 116 embodies a public network, for example the Internet. In some such embodiments, the sensor profiling system 102 may embody a remote or "cloud" system that accesses the computing devices of the operational system 150 over the communications network 116 from a location separate from the physical location of the operational system 150. For example, the sensor profiling system 102 may be embodied by computing device(s) of a central headquarters, server farm, distributed platform, and/or the like. In some such embodiments, the sensor profiling system 102 may be accessed directly (e.g., via a display and/or peripherals operatively engaged with the sensor profiling system 102), and/or may be accessed indirectly through use of a client device. For example, in some embodiments, a user may login (e.g., utilizing a username and password) or otherwise access the sensor profiling system 102 to access the described functionality with respect to one or more particular operational system(s), plant location(s), and/or the like. Alternatively or additionally, in some embodiments, the sensor profiling system 102 is particularly associated with the operational system 150 to provide access specifically to the described functionality with respect to the operational system 150, for example without requiring additional user authentication.

The sensor profiling system 102 comprises one or more computing devices embodied in hardware, software, firmware, and/or the like, that provide the sensor data monitoring and sensor profiling functionality described herein. As depicted, the sensor profiling system includes a server 102A and a data repository 102B that may each be embodied by one or more computing devices communicable with one another to provide the functionality described herein.

The server 102A may include one or more computing devices embodied in hardware, software, firmware, and/or the like, configured to intake and/or process data to provide the described functionality. In some embodiments, the server 102A receives aggregated sensor data from a plurality of sensors 106 of one or more operational systems 150. The server 102A may also receive context data for the plurality of sensors 106. For example, in some embodiments, the server 102A communicates over the communications network 116 to receive or otherwise collect the aggregated sensor data from the sensors 106 and/or the context data for the sensors 106. Alternatively or additionally, in some embodiments, the server 102A communicates over the communications network 116 directly with one or more operational devices 104 and/or associated controller(s) of the operational system 150 to receive the aggregated sensor data embodying configurations and/or other data values associated with data properties and/or operation of the devices(s) 104 and/or operational system 150. Additionally or alternatively still, in some embodiments, the server 102A is configured to process the aggregated sensor data and/or context data to provide various sensor data monitoring and sensor profiling functionality. For example, in some embodiments, the server 102A may process the aggregated sensor data and/or context data to generate one or more sensor characteristic profiles for each sensor type of a plurality of different sensor types of the sensors 106, store the generated sensor characteristic profiles in a sensor type profile database, and/or generate sensor information based at least in part on the stored sensor characteristic profiles.

The data repository 102B may include one or more computing devices embodied in hardware, software, firmware, and/or the like, configured to store and/or otherwise maintain data associated with the sensor data monitoring and sensor profiling functionality described herein. In some embodiments, the data repository 102B stores the aggregated sensor data received from the plurality of sensors 106 of one or more operational systems 150 and/or the context data for the plurality of sensors 106 and/or operational devices 104 of one or more operational systems 150. Additionally or alternatively, in some embodiments, the data repository 102B stores values for one or more historical sensor state values, one or more historical time-varying independent variables, and/or one or more historical categorical features associated with a particular sensor 106 and/or operational device 104 and/or corresponding metadata (e.g., timestamp information embodying when the value was collected or generated, and/or the like). Alternatively or additionally still, in some embodiments, the data repository 102B may comprise one or more type profile databases (e.g., sensor type profile database, device type profile database, virtual sensor type profile database) for storing derived data associated with particular sensors 106, operational devices 104, sensor types, and/or device types, for example sensor characteristic profiles, device characteristic profiles, virtual sensor characteristic profiles, and/or corresponding metadata (e.g., timestamp information embodying when the value was collected or generated, and/or the like).

In some embodiments, for example, the data repository 102B may be embodied by one or more database servers, memory devices, and/or the like, configured for storing such aggregated sensor data, context data, metadata, and characteristic profiles. In some embodiments, the data repository 102B includes one or more remote or "cloud" databases accessible over one or more networks, such as the communications network 116 or a separate communications network (e.g., the Internet).

In some embodiments, one or more sensors 106 and/or operational devices 104 may be associated with at least one other sensor 106 and/or operational device 104, which may be functionally upstream or downstream or may perform related operations. It should be appreciated that a particular sensor 106 or operational device 104 may be tagged with one or more data values that indicate associations between components, for example which components are functionally relevant to each other or included within a common functional subsystem 108. Such functional subsystems 108 of particular components of the operational system 150 may form a configuration of the components with respect to each other that occurs commonly throughout the operational system 150 or other operational systems 150, with combinations of sensors 106 of particular sensor types being commonly defined as part of a functional subsystem 108.

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

Figure 2:
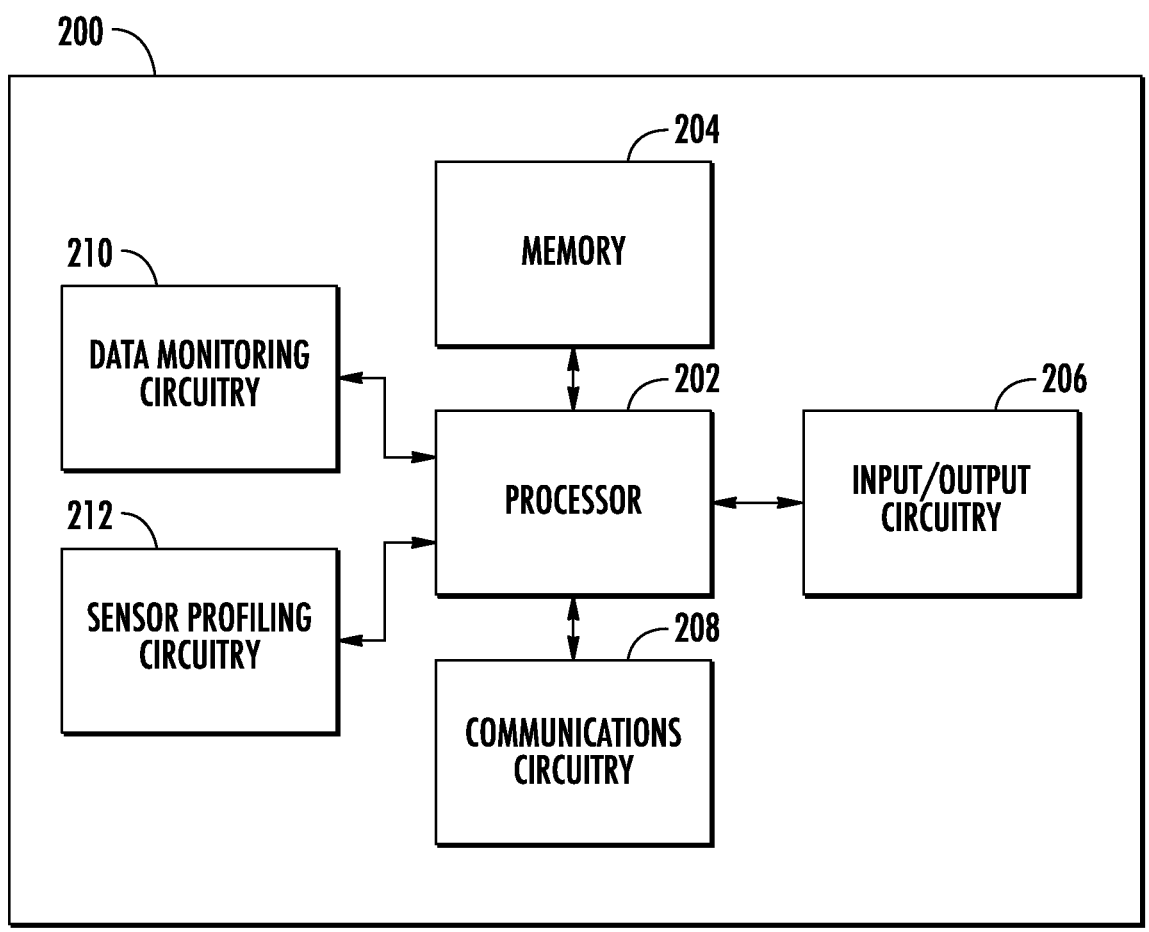
FIG. 2 illustrates a block diagram of an example sensor profiling apparatus that may be specially configured in accordance with an example embodiment of the present disclosure.

In at least one example embodiment, the sensor profiling system 102 is embodied by one or more computing systems, such as the sensor profiling apparatus 200 as shown in FIG. 2. The sensor profiling apparatus 200, as depicted, includes a processor 202, memory 204, input/output circuitry 206, communications circuitry 208, data monitoring circuitry 210, and sensor profiling circuitry 212. Although the components are described with respect to functional limitations, it should be understood that the particular implementations necessarily include the use of particular hardware. It should also be understood that certain of the components described herein in some embodiments include similar or common hardware. For example, in some embodiments two sets of circuitry both leverage use of the same processor, network interface, storage medium, or the like to perform their associated functions, such that duplicate hardware is not required for each set of circuitry. The use of the term "circuitry" as used herein with respect to components of the sensor profiling apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" refers to and/or includes processing circuitry, storage media, network interfaces, input/output devices, and the like. In some embodiments, other elements of the sensor profiling apparatus 200 provide or supplement the functionality of the particular circuitry. For example, in some embodiments the processor 202 provides processing functionality, the memory 204 provides storage functionality, the communications circuitry 208 provides network interface functionality, and the like, to one or more of the other sets of circuitry.

In some embodiments, the processor 202 (and/or co-processor or any other processing circuitry assisting or otherwise associated with the processor) is in communication with the memory 204 via a bus for passing information among components of the apparatus. The memory 204 is non-transitory and in some embodiments includes, for example, one or more volatile and/or non-volatile memories. In other words, for example in some embodiments, the memory embodies a non-transitory electronic storage device (e.g., a computer readable storage medium). In some embodiments, the memory 204 is configured to store information, data, content, applications, instructions, or the like, for enabling the sensor profiling apparatus 200 to carry out various functions in accordance with example embodiments of the present disclosure. In some embodiments, for example, the memory 204 embodies one or more databases for storing user data objects, electronic data objects, and/or other data associated therewith, and/or otherwise is configured to maintain such data objects for accessing and/or updating as described herein.

In various embodiments of the present disclosure, the processor 202 is embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multi-threading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 is configured to execute computer-coded instructions stored in the memory 204 or otherwise accessible to the processor. Alternatively, or additionally, in some embodiments, the processor 202 is configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively or additionally, in another example context, when the processor is embodied as an executor of software instructions, the instructions specifically configure the processor 202 to perform the algorithms and/or operations described herein when the instructions are executed.

As one example context, the processor 202 is configured to support sensor profiling functionality. In some such embodiments, for example, the processor 202 is configured to receive aggregated sensor data from a plurality of sensors 106 of one or more operational systems 150, receive context data for the plurality of sensors 106, generate one or more sensor characteristic profiles for each sensor type of a plurality of different sensor types based at least in part on the aggregated sensor data and context data, store the generated sensor characteristic profiles in a sensor type database, and/or generate sensor information based at least in part on the store sensor characteristic profiles. Additionally or alternatively, in some embodiments, the sensor information may include sensor identification information, sensor type information, and/or context data for a particular sensor, and the processor 202 is configured to determine the sensor identification information, sensor type information, and/or context data for the particular sensor based at least in part on sample sensor data from the particular sensor and the stored one or more sensor characteristic profiles, for example, by generating a sample sensor data signature for the particular sensor based at least in part on the sample sensor data from the particular sensor and matching the sample sensor data signature against sensor data signatures of the stored one or more sensor characteristic profiles. Additionally or alternatively, in some embodiments, the processor 202 is configured to generate the sensor information based at least in part on comparing sensor data signatures of the stored one or more sensor characteristic profiles (e.g., for similar sensor types of different sensor makes) and evaluating the compared sensor data signatures against each other. Additionally or alternatively, in some embodiments, the processor 202 is configured to generate device characteristic profiles (e.g., comprising device type information identifying a device type and a device profile score for the device type) for a plurality of devices to which the plurality of sensors are connected based at least in part on the one or more sensor characteristic profiles. Additionally or alternatively, in some embodiments, the processor 202 is configured to generate one or more normalized profiles of the one or more sensor characteristic profiles by converting different instances of time series sensor data for different sensors to a common index system. Additionally or alternatively, in some embodiments, the processor 202 is configured to generate a central characteristic profile of the one or more sensor characteristic profiles by identifying a time window within which sensor data for sensors of the sensor type is sufficiently representative of the sensor type, extracting sensor data within the identified time window for sensors of the sensor type, and generating the sensor data signature of the central characteristic profile with respect to the extracted sensor data from within the identified time window. Additionally or alternatively, in some embodiments, the processor 202 is configured to generate one or more virtual sensor characteristic profiles for one or more virtual sensor types, each of which is defined with respect to a particular combination of different sensor types of the plurality of sensor types, by combining the sensor data signatures of the sensor characteristic profiles for the particular combination of different sensor types. Additionally or alternatively, in some embodiments, the processor 202 is configured to generate sensor information including comparison information for different sensor types of the plurality of sensor types and/or evaluation information indicating performance of a sensor type of the plurality of sensor types.

In some embodiments, the sensor profiling apparatus 200 includes input/output circuitry 206 that, alone or in communication with processor 202, provides output to the user and/or receives indication(s) of user input. In some embodiments, the input/output circuitry 206 comprises one or more user interfaces, and/or includes a display to which user interface(s) may be rendered. In some embodiments, the input/output circuitry 206 comprises a web user interface, a mobile application, a desktop application, a linked or networked client device, and/or the like. In some embodiments, the input/output circuitry 206 also includes any of a number of peripherals, a keyboard, a mouse, a joystick, a touch screen, touch areas, soft keys, a microphone, a speaker, or other input/output mechanisms. In some such embodiments, the input/output mechanisms are configured to enable a user to provide data representing search criteria and/or analysis criteria for processing by the sensor profiling apparatus 200

(e.g., to generate sensor information). The processor 202 and/or input/output circuitry 206 communicable with the processor 202, is configured to control one or more functions of one or more user interface elements through computer program instructions (e.g., software and/or firmware) stored on a memory accessible to the processor (e.g., memory 204, and/or the like).

In some embodiments, the sensor profiling apparatus 200 includes communications circuitry 208. The communications circuitry 208 is embodied by any means such as a device or circuitry embodied in either hardware or a combination of hardware and software that is configured to receive and/or transmit data from/to a network and/or any other device, circuitry, or other module in communication with the sensor profiling apparatus 200. In this regard, the communications circuitry 208 includes, in some embodiments for example, at least a network interface for enabling communications with a wired or wireless communications network. For example, in some embodiments, the communications circuitry 208 includes one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In some embodiments, the sensor profiling apparatus 200 includes data monitoring circuitry 210. The data monitoring circuitry 210 includes hardware, software, firmware, and/or a combination thereof, configured to support data gathering and storing functionality associated with sensor profiling functionality of the sensor profiling system 102. The data monitoring circuitry 210, in some embodiments, utilizes processing circuitry such as the processor 202 to perform one or more of these actions. Additionally or alternatively, the data monitoring circuitry 210, in some embodiments, utilizes one or more portions of communications circuitry, such as some or all of the communications circuitry 208, to communicate with one or more other computing devices and/or receive data from such computing devices. In some embodiments, the data monitoring circuitry 210 is configured to receive aggregated time series sensor data and/or context data for a plurality of sensors 106 of different sensor types (e.g., from one or more operational systems 150). The data monitoring circuitry 210 may include hardware, software, firmware, and/or a combination thereof configured to request and/or receive such sensor data and/or context data, and/or to store and/or maintain the aggregated sensor data, context data, and/or data derived therefrom in one or more repositories. In some embodiments, for example, the data monitoring circuitry 210 includes software, hardware, firmware, and/or a combination thereof, to store sensor data and context data as received in a first data repository for storing such data maintained on or otherwise accessible to the sensor profiling apparatus 200. It should be appreciated that, in some embodiments, the data monitoring circuitry 210 includes or is embodied by a separate processor, specially configured field programmable gate array (FPGA), and/or a specially configured application-specific integrated circuit (ASIC).

The sensor profiling circuitry 212 includes hardware, software, firmware, and/or a combination thereof, configured to perform one or more of the following actions associated with the sensor profiling system 102: generating one or more sensor characteristic profiles for each sensor type of the plurality of different sensor types based at least in part on the aggregated time series sensor data and the context data (e.g., received by the data monitoring circuitry 210), storing the one or more sensor characteristic profiles for each sensor type in a sensor type profile database, generating sensor information based at least in part on the stored one or more sensor characteristic profiles, determining sensor identification information, sensor type information, and/or context data (of the generated sensor information) for a particular sensor, generating device characteristic profiles, generating virtual sensor characteristic profiles, and generating comparison information and/or evaluation information (of the generated sensor information). The sensor profiling circuitry 212 may include hardware, software, firmware, and/or a combination thereof configured to store and/or maintain data derived from the aggregated sensor data and/or context data in one or more repositories, the derived data including, for example, sensor characteristic profiles, device characteristic profiles, virtual sensor characteristic profiles, and/or generated sensor information. In some embodiments, for example, the data monitoring circuitry 210 includes software, hardware, firmware, and/or a combination thereof, to store such derived data in a second data repository (e.g., including a sensor type profile database) maintained on or otherwise accessible to the sensor profiling apparatus 200.

In some embodiments, the sensor profiling circuitry 212 includes or is embodied by a separate processor, specially configured field programmable gate array (FPGA), and/or a specially configured application-specific integrated circuit (ASIC). In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, the data monitoring circuitry 210 and the sensor profiling circuitry 212 are embodied by a single set of circuitry, and/or one or more of the data monitoring circuitry 210 and/or the sensor profiling circuitry 212 are combined with the processor 202. Additionally or alternatively, in some embodiments, one or more of the sets of circuitry described herein is/are configured to perform one or more of the actions described with respect to one or more of the other sets of circuitry.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

In general, FIGS. 3-7, 9, 10, 12, and 13 illustrate flowcharts including operational blocks of example processes for sensor profiling, in accordance with at least some example embodiments of the present disclosure. More particularly, FIGS. 3-7, 9, 10, 12, and 13 depict steps or operations of example processes 300, 400, 500, 600, 700, 900, 1000, 1050, 1200, 1300, 1350. In some embodiments, the computer-implemented processes of FIGS. 3-7, 9, 10, 12, and 13 are embodied by computer program code stored on a non-transitory computer-readable medium of a computer program product configured for execution to perform the computer-implemented method. Alternatively or additionally, in some embodiments, the example processes of FIGS. 3-7, 9, 10, 12, and 13 are performed by one or more specially configured computing devices, such as the sensor profiling system 102 embodied by the specially configured sensor profiling apparatus 200. In this regard, in some such embodiments, the sensor profiling apparatus 200 is specially configured by computer program instructions stored thereon, for example in the memory 204 and/or another component depicted and/or described herein, and/or otherwise accessible to the sensor profiling apparatus 200, for performing the operations as depicted and described with respect to the example processes of FIGS. 3-7, 9, 10, 12, and 13. In some embodiments, the specially configured sensor profiling apparatus 200 includes and/or otherwise is in communication with one or more external apparatuses, systems, devices, and/or the like, to perform one or more of the operations as depicted and described.

Figure 3:
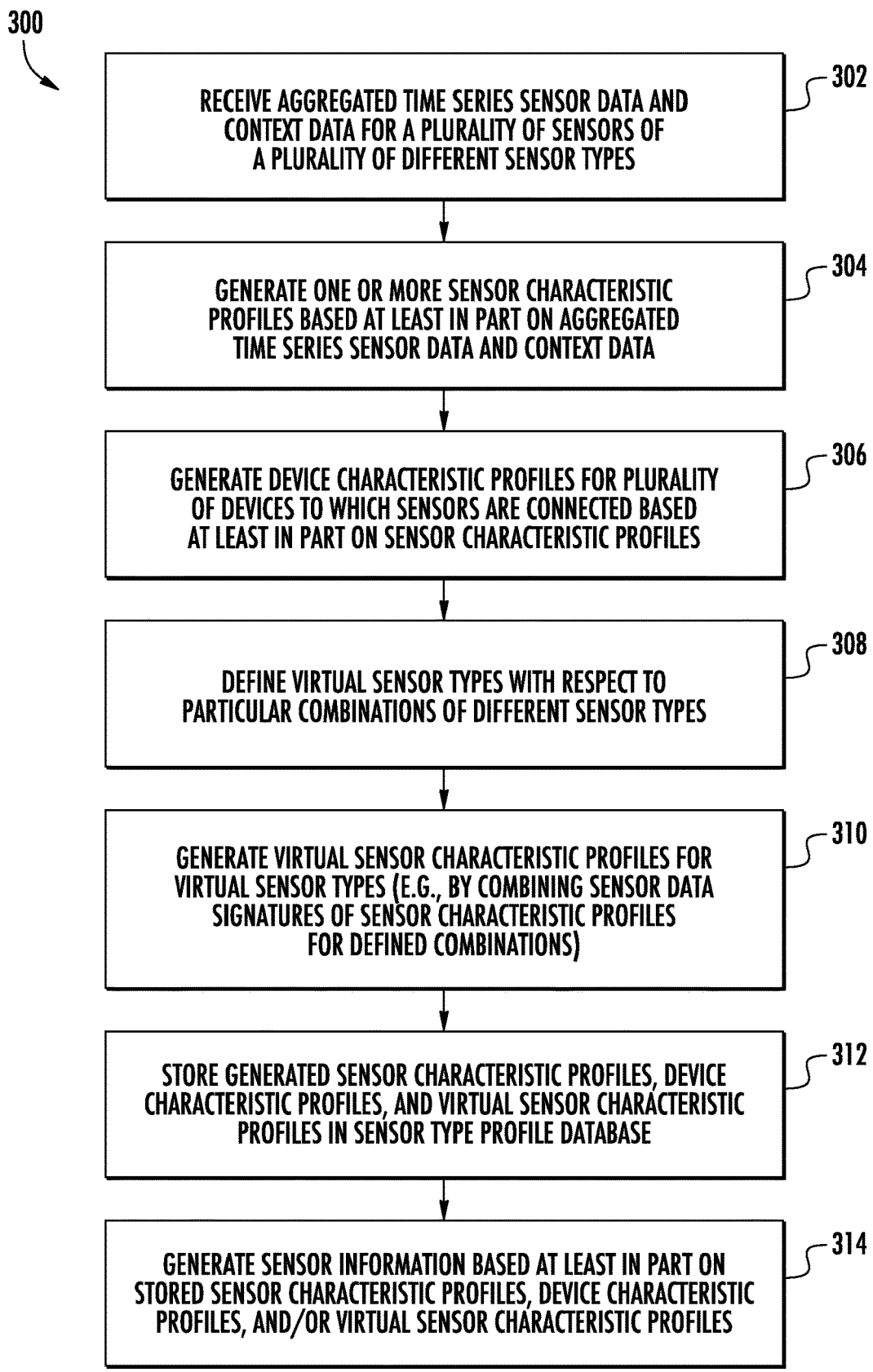
FIG. 3 illustrates a flowchart including operational blocks of an example process for sensor profiling, in accordance with at least some example embodiments of the present disclosure.

FIG. 3 illustrates a flowchart including operational blocks of an example process for sensor profiling, in accordance with at least some example embodiments of the present disclosure. Specifically, FIG. 3 depicts steps or operations of an example process 300.

The process 300 begins at step/operation 302, at which a processor (such as, but not limited to, the processor 202 of the sensor profiling apparatus 200 described above in connection with FIG. 2) receives aggregated time series sensor data and context data for a plurality of sensors of a plurality of different sensor types. Here, the processor may receive the sensor data from one or more sensor(s) 106 directly, from one or more operational devices 104 associated with one or more sensors(s) 106 that produced the sensor data, from controller(s) of the operational system 150 associated with one or more sensor(s) 106 that produced the sensor data, and/or the like. The processor may receive the sensor data from a plurality of sensors 106 of one or more operational systems 150. In some embodiments, the processor may be configured to request and/or receive such sensor data, for example in real time. Additionally or alternatively, in some embodiments the processor may automatically receive sensor data, for example in real time at particular timestamp intervals (e.g., every minute, every 5 minutes, every hour, and/or the like) or continuously. The processor may be configured to receive the context data for some or all of the plurality of sensors 106 from which the aggregated sensor data is collected. The processor may receive some or all of the context data during an initial provisioning or configuration phase for the sensors 106 and/or the operational system 150. The processor may receive the context data directly from the sensors 106 and/or from devices 104 and/or controllers connected to the sensors 106, and/or via the input/output circuitry 206 (e.g., as user input). The processor may store the received aggregated time series sensor data and/or context data as received in one or more data repositories.

The sensor data received in step 302 may be aggregated from a plurality of sensors 106 of a plurality of different sensor types from one or more operational systems 150. Such sensor data may be time series sensor data. For example, the sensor data for a given sensor 106 may comprise a series of sensor values or sensor state values produced by the given sensor 106 at particular instances of time, with the instances of time represented by timestamps associated with each of the sensor values. The aggregated sensor data may include sensor values that originated from analog sensors 106 in the form of analog signals and recorded or logged in digital form with timestamps associated with each of the recorded analog signals (e.g., by an operational device 104 and/or controller connected to the analog sensor 106). The received sensor data may comprise an aggregation of series of sensor values and associated timestamps for each of a plurality of sensors 106 (of a plurality of different sensor types) from one or more operational systems 150. The processor (e.g., of the sensor profiling apparatus 200 and/or the server 102A) may be configured to collect and/or receive the sensor data in real-time or at periodic intervals. Moreover, the processor may be configured to collect and/or receive the sensor data over a period of time and store the sensor data (e.g., in the data repository 102B and/or the memory 204) as historical sensor data. The sensor data may comprise historical sensor states and/or telemetry data that is collected from various sensors 106. The sensor states may have been collected continuously or at particular time intervals (e.g., every 1 minute, 5 minutes, 30 minutes, hourly, daily, weekly, monthly, and/or the like). The aggregated sensor data may be collected from sensors 106 within the operational devices 104 and/or operational systems 150, connected to the operational devices 104, positioned in the environments of the operational devices 104 or operational systems 150, and/or the like. The aggregated sensor data may include data collected over any suitable time frame (e.g., a month, three months, a year).

For the purpose of illustration, in some example embodiments, the sensor data from an HVAC chiller may include values for some or all of the following sensor states (and may include others not listed): chilled water flow rate, chilled water return temperature, chilled water supply temperature, cooling water flow rate, cooling water return temperature, cooling water supply temperature, cooling capacity, chiller status, instantaneous power consumption, chilled water supply set point, condenser refrigerant pressure, condenser refrigerant saturation temperature, evaporator refrigerant pressure, evaporator refrigerant saturation temperature, refrigerant level position, total power consumption, and mode of operation, to list a few examples.

The context data may be metadata for the various components (e.g., sensors 106, operational devices 104, actuators) of the operational system 150 describing information about the individual components as well as information about relationships between the various components. The context data may include an ontology model providing a representation of each of the various components, classification of the components into various categories (e.g., sensor types, device types, sensor makes), definition of various attributes of the components and/or categories, and/or definition of relationships between the components and/or categories. The context data may include identification information for individual components of the operational system 150, type information for the individual components assigning types to each of the components, properties associated with the identification information and/or the type information, locations of the components within the operational system 150 and/or an environment where the operational system 150 is installed, functional and/or physical locations of the components with respect to each other, relationships between the components with respect to each other, relationships between types of the components with respect to each other, and/or roles of the components and/or types of components within the operational system 150 and/or within operational devices 104, to name a few examples. The context data may be provided for all of the sensors 106 and/or operational devices 104 of the operational system 150 or may be limited to only a subset of known sensors 106 and/or operational devices 104, with the remaining sensors 106 and/or operational devices 104 being unknown. The context data may be provided at varying levels for different sensors 106 and/or operational devices 104, for example, with some of the components having full context data, with all possible attributes defined for the components, and other components having only limited context data, with only some or none of the possible attributes defined for the components. According to one common configuration, the context data may be available for all operational devices 104 and/or sensors 106 of makes that are compatible with the sensor profiling system but not available or only partially available for components of other makes that are incompatible with the sensor profiling system, for example, by virtue of the sensors 106 and/or operational devices 104 of the compatible makes being configured to communicate context data (e.g., to the server 102A and/or the sensor profiling apparatus 200) and the sensors 106 and/or operational devices 104 of the incompatible makes not being configured to communicate context data or only being configured to communicate context data to systems, servers, and/or apparatuses different from the sensor profiling system 100, the server 102A, and/or the sensor profiling apparatus 200.

At step/operation 304 of the process 300, a processor (such as, but not limited to, the processor 202 of the sensor profiling apparatus 200 described above in connection with FIG. 2) generates one or more sensor characteristic profiles for each sensor type of the plurality of different sensor types based at least in part on the aggregated time series sensor data and the context data.

The sensor characteristic profiles may refer generally to a data object describing information representative of a particular sensor type of one or more sensors 106, which information may be used to identify and determine information about individual sensors 106, evaluate performance of individual sensors 106 and/or sensor types, compare sensor types with respect to each other, and/or discover trend and/or seasonality information with respect to the sensor types and/or sensors 106, to list a few examples. Each of the one or more sensor characteristic profiles (e.g., generated in step/operation 304) may comprise sensor type information and a sensor data signature for the sensor type.

The sensor type information of the sensor characteristic profile may refer to a data object that identifies a sensor type (e.g., to which the sensor characteristic profile pertains) of the plurality of sensor types. The sensor type information may comprise a sensor type identifier associated with a particular sensor type. The sensor type identifier may be a reference to a predefined sensor type data object (e.g., defined within the context data) corresponding to the particular sensor type and/or comprising a combination of attributes representative of properties, characteristics, and/or identifying details of the particular sensor type. The sensor type identifier may match or correspond with analogous references to the particular sensor type provided throughout the context data in defining various relationships, roles, and/or attributes associated with the sensor type. Generally, the sensor types represented by the sensor type data objects may be representative of a group or class of sensors 106, the groups or classes being predefined as part of any system of organizing and/or classifying the plurality of sensors 106 suitable to monitoring, maintenance, assessment, evaluation, and/or analysis of one or more operational systems 150. In one example, sensor types may be defined (e.g., via the sensor type data objects) with respect to functional characteristics of all individual sensors 106 of that type, such as "temperature sensor." Moreover, sensor types may be defined with respect to a combination of a primary characteristic (e.g., functional) with one or more secondary characteristics that may distinguish between individual sensors 106 that nevertheless share the primary characteristic. For example, multiple sensor types may be defined with respect to the "temperature sensor" primary characteristic, resulting in a series of "temperature sensor" sensor types such as "temperature sensor TS1," "temperature sensors TS2," etc., with each of the individual sensors 106 within each of the "temperature sensor" sensor types sharing secondary characteristics that distinguish the sensors 106 from those of the other "temperature sensor" sensor types, with the primary "temperature sensor" characteristic being shared by all of the individual sensors 106 across all of the "temperature sensor" sensor types.

The sensor data signature of the sensor characteristic profile may refer to a data object that describes sensor data collected from a plurality of individual sensors 106 of a particular sensor type, the described sensor data being representative of the particular sensor type and/or individual sensors 106 of the particular sensor type. In one example, distinguishing patterns (e.g., over periods of time) within the sensor data described by the sensor data signature may be sufficiently prevalent within time series sensor data collected from individual sensors 106 of the particular sensor type and sufficiently distinctive with respect to sensor data collected from individual sensors 106 not of the particular sensor type so that the sensor data described by the sensor data signature (e.g., the distinguishing patterns within such sensor data) may represent the sensor type and/or all individual sensors 106 of the sensor type. Accordingly, the sensor data signature for each sensor type may be generated based at least in part on the sensor data collected from individual sensors 106 of that sensor type and/or sensor data from sensors 106 of all sensor types over one or more periods of time. The sensor data signature for each sensor type may comprise and/or describe some or all of the sensor data collected from individual sensors 106 of the sensor type, a combination of some or all of the sensor data collected from a plurality of individual sensors 106 of the sensor type, and/or one or more transformations of the individual or combined sensor data. The sensor data signature for each sensor type may describe characteristics and/or distinguishing patterns (e.g., over time) of the individual and/or combined sensor data from sensors 106 of the sensor type based at least in part on transformation and/or analysis of the individual and/or combined sensor data. The processor may be configured to generate the sensor data signature based at least in part on the individual and/or combined sensor data from sensors 106 of the sensor type by determining distinguishing patterns (e.g., over time) within the sensor data and generating the sensor data signature to describe the distinguishing patterns, which may be represented, for example, by a wave form of the sensor data signature (and/or a data series indicative of such a wave form).

At step/operation 306 of the process 300, a processor (such as, but not limited to, the processor 202 of the sensor profiling apparatus 200 described above in connection with FIG. 2) generates device characteristic profiles for a plurality of operational devices 104 to which the plurality of sensors 106 are connected based at least in part on the one or more sensor characteristic profiles. Each of the device characteristic profiles may comprise device type information and a device profile score for the device type.

Similar to the sensor type information, the device type information of the device characteristic profile may refer to a data object that identifies a device type (e.g., to which the device characteristic profile pertains) of a plurality of device types. The device type information may comprise a device type identifier associated with a particular device type. The device type identifier may be a reference to a predefined device type data object (e.g., defined within the context data) corresponding to the particular device type and/or comprising a combination of attributes representative of properties, characteristics, and/or identifying details of the particular device type. The device type identifier may match or correspond with analogous references to the particular device type provided throughout the context data in defining various relationships, roles, and/or attributes associated with the device type. Generally, the device types represented by the device type data objects may be representative of a group or class of operational devices 104, the groups or classes being predefined as part of any system of organizing and/or classifying the operational devices 104 suitable to monitoring, maintenance, assessment, evaluation, and/or analysis of one or more operational systems 150.

The device profile score of the device characteristic profile may refer to a data object, associated with a particular device type of operational devices 104, that describes a combination of sensor data signatures for a selected subset of the plurality of sensor types, the selected subset corresponding to sensors 106 normally connected to operational devices 104 of the device type, and the described combination of sensor data signatures being representative of the particular device type and/or individual operational devices 104 of the particular device type. The processor may be configured to generate the device profile score for a particular device type by combining the sensor data signatures for the selected subset of sensor types associated with the particular device type (e.g., within the context data). The processor may combine the sensor data signatures by adding and/or averaging values of the sensor data signatures for the selected subset of sensor types. In one example, the processor may combine the sensor data signatures (e.g., values) for all analog sensor types within the selected subset of sensor types into a series of combined analog sensor values, combine the sensor data signatures (e.g., values) for all digital sensor types within the selected subset of sensor types into a series of combined digital sensor values, and compute an average of the series of combined analog values and/or an average of the series of combined digital values. The device profile score may comprise the computed average of the series of combined analog values and/or the computed average of the series of combined digital values. The device profile score may comprise a single value (e.g., numerical value) generated based at least in part on the analog and digital computed averages (e.g., an average of the averages). In another example, the device profile score may be represented, for example, by one or more wave forms resulting from the combination of the sensor data signatures for the selected subset of sensor types (and/or one or more data series indicative of the one or more such wave forms).

At step/operation 308 of the process 300, a processor (such as, but not limited to, the processor 202 of the sensor profiling apparatus 200 described above in connection with FIG. 2) defines one or more virtual sensor types with respect to particular combinations of different sensor types of the plurality of sensor types. The processor may be configured to define the one or more virtual sensor types based at least in part on user-defined configuration information (e.g., received as user input via the input/output circuitry 206). A virtual sensor type may correspond to functional subsystems 108 of the operational system 150 and/or to any selected subsets of sensors 106 of the plurality of sensors 106 that are related, functionally relevant to each other, and/or configured to perform related operations, in which sensor types of the sensors 106 of the functional subsystems 108 and/or selected subsets may form particular combinations or configurations of sensor types that may occur commonly throughout one or more operational systems 150 and/or may be pertinent to monitoring, maintenance, assessment, evaluation, and/or analysis of one or more aspects of one or more operational systems 150. The one or more virtual sensor types may be defined within the context data, for example, as one or more virtual sensor type data objects corresponding to the one or more virtual sensor types and comprising a combination of attributes representative of properties, characteristics, and/or identifying details of the virtual sensor type (e.g., including a virtual sensor type identifier). The virtual sensor type (e.g., represented by a virtual sensor type data object) may be defined with respect to a particular combination of different sensor types, for example, identifying each sensor type included in the particular combination of different sensor types that makes up the virtual sensor type. For the purpose of illustration, in the example depicted in FIG. 1, each of the different sensors 106-2, 106-6, 106-7 included in the functional subsystem 108 may be of different sensor types, and a virtual sensor type may be defined as including a combination of each of the different sensor types of the sensors 106-2, 106-6, 106-7 included in the functional subsystem 108. It will be appreciated, however, that any combination of different sensor types may form a virtual sensor type.

At step/operation 310 of the process 300, a processor (such as, but not limited to, the processor 202 of the sensor profiling apparatus 200 described above in connection with FIG. 2) generates one or more virtual sensor characteristic profiles for one or more virtual sensor types (e.g., of the virtual sensor types defined in step 308), each of which is defined with respect to a particular combination of different sensor types of the plurality of sensor types. The processor may be configured to generate the one or more virtual sensor characteristic profiles based at least in part on the one or more sensor characteristic profiles (e.g., generated in step 304). Each of the virtual sensor characteristic profiles may comprise virtual sensor type information (e.g., a virtual sensor type identifier, which may be a reference to a virtual sensor type data object for a defined virtual sensor type) and a virtual sensor signature. In one example, the processor may be configured to generate the virtual sensor signature of a virtual sensor characteristic profile for a particular virtual sensor type by combining the sensor data signatures of the sensor characteristic profiles for the particular combination of different sensor types corresponding to the particular virtual sensor type. The processor may combine the sensor data signatures by adding and/or averaging values of the sensor data signatures for the particular combination of different sensor types. The combined sensor data signatures of the virtual sensor signature may be represented, for example, by a wave form resulting from the combination of the sensor data signatures (and/or a data series indicative of such a wave form). For the purpose of illustration, in the example depicted in FIG. 1, a virtual sensor characteristic profile may be generated for a virtual sensor type associated with the functional subsystem 108 of the operational system 150 based at least in part on the sensor type characteristic profiles for each of the different sensor types of the sensors 106-2, 106-6, 106-7 included in the functional subsystem 108. It will be appreciated, however, that a virtual sensor characteristic profile may be generated for any combination of different sensor types that are defined as forming a virtual sensor type.

At step/operation 312 of the process 300, a processor (such as, but not limited to, the processor 202 of the sensor profiling apparatus 200 described above in connection with FIG. 2) stores the one or more sensor characteristic profiles (e.g., generated in step/operation 304), the device characteristic profiles (e.g., generated in step/operation 306), and/or the virtual sensor characteristic profiles (e.g., generated in step/operation 310) in one or more data repositories, such as a sensor type profile database (e.g., stored in the data repository 102B of the sensor profiling system 102 and/or the memory 204 of the sensor profiling apparatus 200).

At step/operation 314 of the process 300, a processor (such as, but not limited to, the processor 202 of the sensor profiling apparatus 200 described above in connection with FIG. 2) generates sensor information based at least in part on the stored one or more sensor characteristic profiles, the stored device characteristic profiles, and/or the stored virtual sensor characteristic profiles. The sensor information may comprise one or more data constructs describing any desired information (e.g., indicated in user-configured search criteria and/or analysis criteria received via the input/output mechanisms of the input/output circuitry 206 of the sensor profiling apparatus 200) including possibly identification information, type information, context data, characteristics profiles, signatures, profile scores, comparison information, evaluation information, performance information, seasonality information, and/or trend information concerning any individual sensors 106, groups of sensors 106, sensor types, individual operational devices 104, groups of operational devices 104, device types, functional subsystems 108, individual virtual sensors, groups of virtual sensors, virtual sensor types, and/or operational systems 150.

Figure 4:
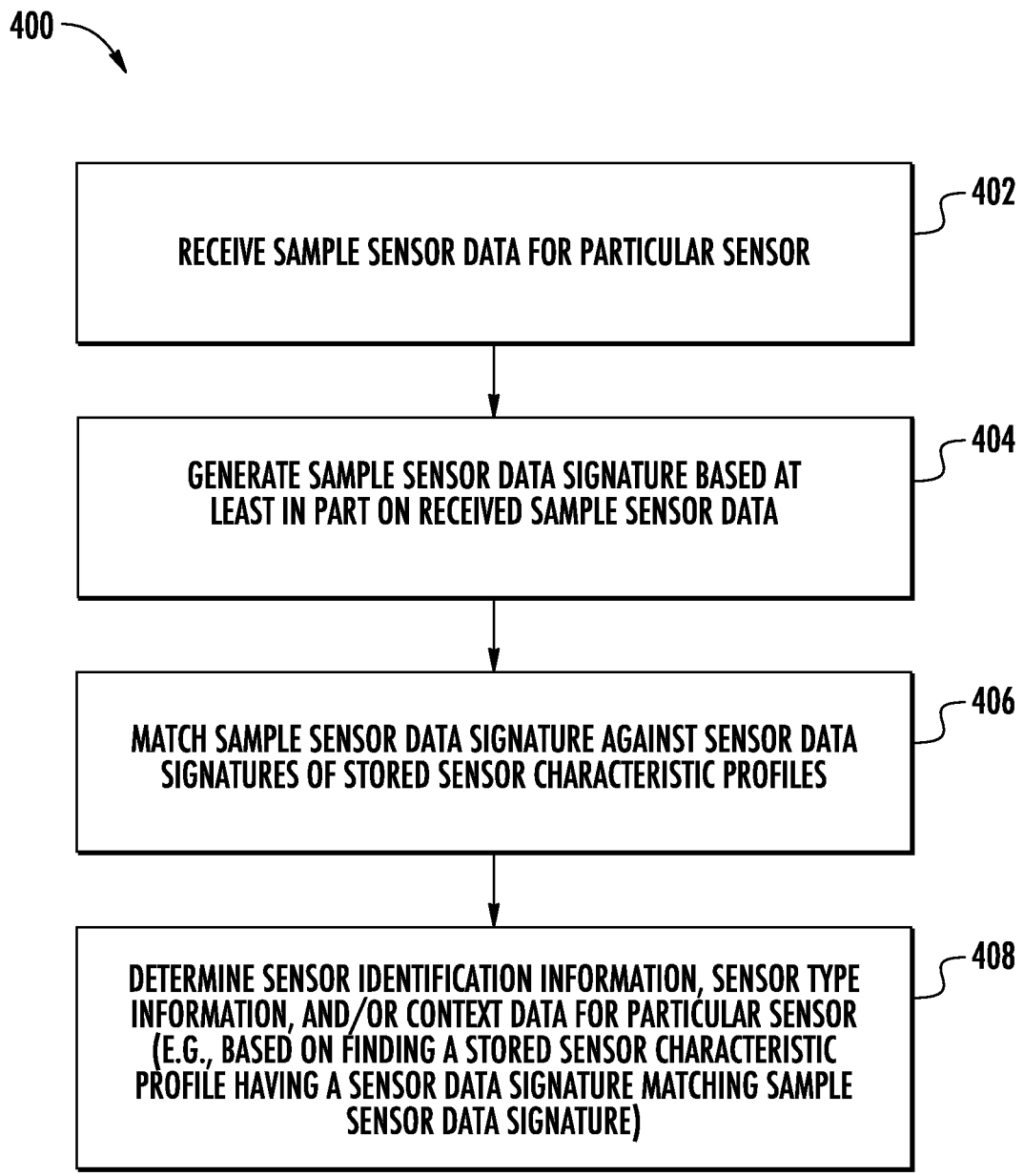
FIG. 4 illustrates a flowchart including operational blocks of an example process for sensor profiling, providing details about how sensor information may be generated according to some embodiments of the present disclosure.

FIG. 4 illustrates a flowchart including operational blocks of an example process for sensor profiling, in accordance with at least some example embodiments of the present disclosure. Specifically, FIG. 4 depicts steps or operations of an example process 400, providing additional details of how the sensor information may be generated based at least in part on the stored one or more sensor characteristic profiles (e.g., as depicted and described with respect to step/operation 314).

The process 400 begins at step/operation 402, at which a processor (such as, but not limited to, the processor 202 of the sensor profiling apparatus 200 described above in connection with FIG. 2) receives sample sensor data for a particular sensor 106.

The particular sensor 106 may be an individual sensor 106 of the plurality of sensors 106. The particular sensor 106 may be an unknown sensor by virtue of the sensor profiling system 102 and/or sensor profiling apparatus 200 having access only to limited or no context data (e.g., identification information, type information, relationships, locations, roles), such as having access to context data insufficient for identifying, classifying, evaluating, and/or analyzing the sensor 106. For example, sensor data produced by the particular sensor 106, including the sample sensor data received in step/operation 402, may not be associated with any of the context data and/or may only be associated with sensor identification information (e.g., a sensor identifier) that is not referenced within the context data available to the processor.

The sample sensor data for the particular sensor received in step/operation 402 may be similar to or an instance of the sensor data generally defined and described above with respect to step/operation 302 (e.g., time series sensor data, a series of sensor values or sensor state values produced by the particular sensor 106 at particular instances of time, with the instances of time represented by each of the sensor values) and may be included in the received aggregated time series sensor data or may be received separately from the aggregated time series sensor data (e.g., subsequent with respect to the aggregated time series sensor data that is used in generating the one or more sensor characteristic profiles). The sample sensor data may refer to an isolated set of sensor data produced by and associated with the particular sensor 106.

At step/operation 404 of the process 400, a processor (such as, but not limited to, the processor 202 of the sensor profiling apparatus 200 described above in connection with FIG. 2) generates a sample sensor data signature for the particular sensor 106 based at least in part on the sample sensor data from the particular sensor 106.

Generally, the sample sensor data signature (e.g., generated in step/operation 404) may be similar to the sensor data signature defined and described above with respect to step/operation 304 and may be generated using the same process as that defined and described above with respect to step/operation 304. In various embodiments, the sample sensor data signature may refer to a data object that describes the sample sensor data collected from the particular sensor 106, the described sensor data being indicative of a sensor type of the particular sensor and/or representative of the particular sensor 106 itself. As before, distinguishing patterns (e.g., over periods of time) within the sample sensor data described by the sample sensor data signature may be sufficiently prevalent within the sample sensor data collected from the particular sensor 106 so that the sensor data described by the sample sensor data signature (e.g., the distinguishing patterns within such sample sensor data) may indicate a sensor type of the particular sensor 106 and/or may represent the particular sensor 106 itself. The sample sensor data signature may be generated based at least in part on the sample sensor data collected from the particular sensor 106. The sample sensor data signature may comprise and/or describe some or all of the sample sensor data collected from the particular sensor 106 and/or one or more transformations of the sample sensor data. The sample sensor data signature for the particular sensor 106 may describe characteristics and/or distinguishing patterns (e.g., over time) of the sample sensor data based at least in part on transformation and/or analysis of the sample sensor data. The processor may be configured to generate the sample sensor data signature based at least in part on the sample sensor data from the particular sensor 106 by determining distinguishing patterns (e.g., over time) within the sample sensor data and generating the sample sensor data signature to describe the distinguishing patterns, which may be represented, for example, by a wave form of the sample sensor data signature (and/or a data series indicative of such a wave form).

In various embodiments, generating the sample sensor data signature for the particular sensor 106 may comprise determining one or more windows of time within the sample sensor data from the particular sensor 106 within which distinguishing patterns (e.g., over the duration of the determined window of time) in the sensor values may be sufficiently prevalent and/or sufficiently distinctive so that the sample sensor data for the determined window of time may be used to generate the sample sensor data signature and/or included in the sample sensor data signature for the particular sensor 106. In this way, the sample sensor data signature may comprise and/or describe only a representative subset or "snapshot" of the sample data for the particular sensor 106, namely only those sensor values within the determined window of time.

At step/operation 406 of the process 400, a processor (such as, but not limited to, the processor 202 of the sensor profiling apparatus 200 described above in connection with FIG. 2) matches the sample sensor data signature generated in step/operation 404 against the sensor data signatures of the stored one or more sensor characteristic profiles. In various embodiments, the processor may be configured to, using the sample sensor data signature as an input parameter, execute one or more search, lookup, and/or retrieval processes with respect to the sensor data signatures of the stored one or more sensor characteristic profiles. In one example, the processor may be configured to compare the sample sensor data signature to each sensor data signature or a selected subset of the sensor data signatures of the stored one or more sensor characteristic profiles, select one of the sensor data signatures of the stored one or more sensor characteristic profiles that matches the sample sensor data signature, and return the sensor characteristic profile that contains the sensor data signature that matches the sample sensor data signature. The processor may be configured to return an indication that no match is found in response to determining that none of the sensor data signatures of the stored one or more sensor characteristic profiles matches the sample data signature for the particular sensor 106.

At step/operation 408 of the process 400, a processor (such as, but not limited to, the processor 202 of the sensor profiling apparatus 200 described above in connection with FIG. 2) determines sensor identification information, sensor type information, and/or context data for the particular sensor 106 (e.g., based at least in part on the matching of the sample sensor data signature against the sensor data signatures of the stored one or more sensor characteristic profiles performed in step/operation 406). In various embodiments, the processor may be configured to, in response to finding a stored sensor characteristic profile having a sensor data signature matching the sample sensor data signature, retrieve stored sensor identification information, sensor type information, and/or context data for the particular sensor 106 based at least in part on the matching sensor characteristic profile (e.g., based at least in part on sensor type information or other identifying information included in the sensor characteristic profile and referenced within other stored information such as the context data). The processor may be configured to present the matching sensor characteristic profile, or any information included therein, via the input/output circuitry 206 (e.g., via a user interface). The processor may be configured to generate and store context data and/or update existing context data associated with the particular sensor 106 based at least in part on the information obtained from the matching sensor characteristic profile. For example, for a particular sensor 106 of an unknown sensor type, the processor may be configured to assign a sensor type (e.g., corresponding to the sensor type information included in the matching sensor characteristic profile) to the particular sensor 106 within new or existing context data and store the new or updated context data.

Figure 5:
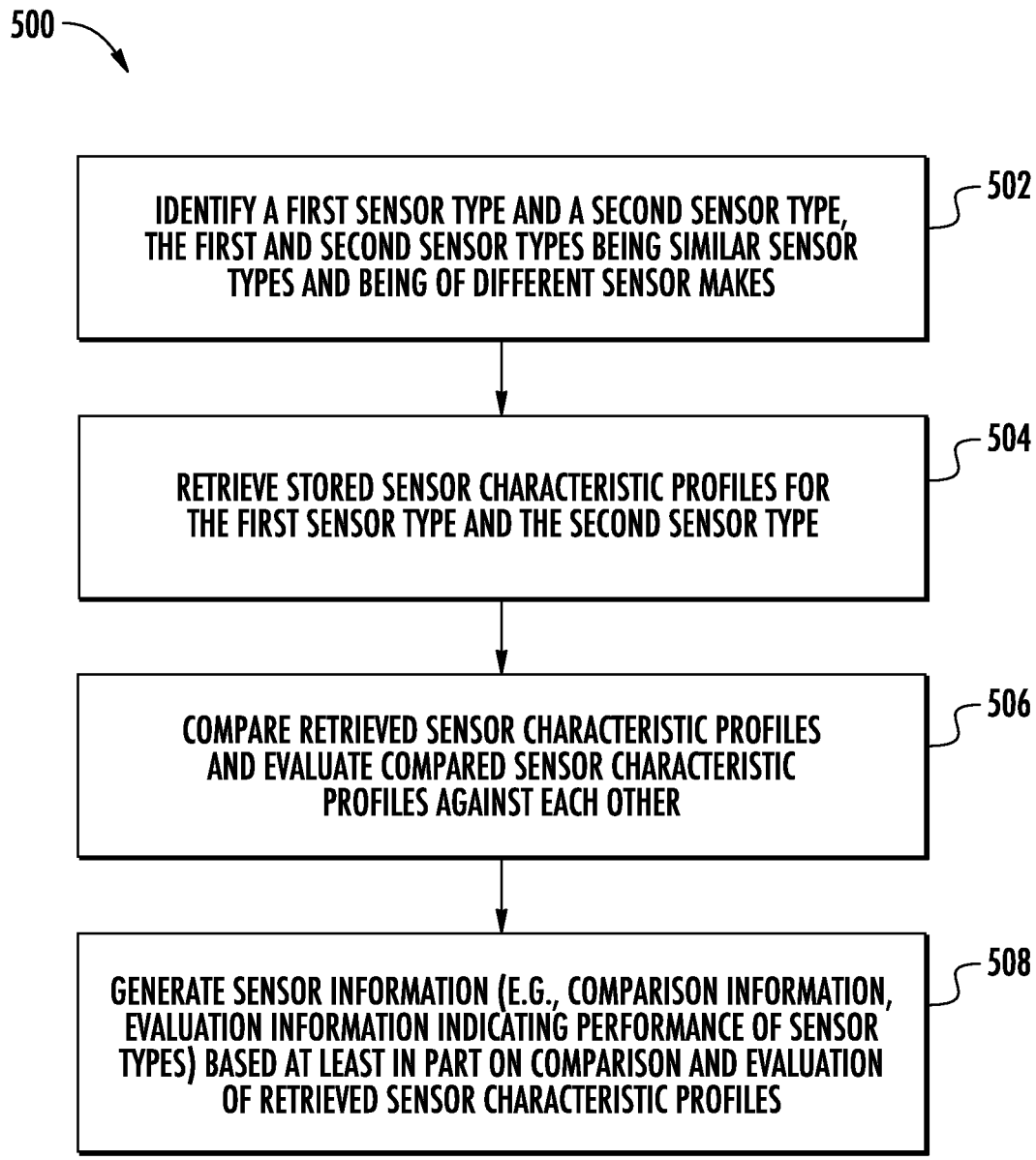
FIG. 5 illustrates a flowchart including operational blocks of an example process for sensor profiling, providing details about how sensor information may be generated according to some embodiments of the present disclosure.

FIG. 5 illustrates a flowchart including operational blocks of an example process for sensor profiling, in accordance with at least some example embodiments of the present disclosure. Specifically, FIG. 5 depicts steps or operations of an example process 500, providing additional details of how the sensor information may be generated based at least in part on the stored one or more sensor characteristic profiles (e.g., as depicted and described with respect to step/operation 314).

The process 500 begins at step/operation 502, at which a processor (such as, but not limited to, the processor 202 of the sensor profiling apparatus 200 described above in connection with FIG. 2) identifies a first sensor type and a second sensor types, the first sensor type and second sensor type being of similar sensor types but of different sensor makes. Here, the processor may be configured to identify the first sensor type and the second sensor type based at least in part on configuration information and/or input received via the input/output mechanisms of the input/output circuitry 206 of the sensor profiling apparatus 200 (e.g., user-configured search criteria and/or analysis criteria). For example, the processor may be configured to identify the first sensor type and the second sensor type based at least in part on input detected via the input/output circuitry 206 indicative of a selection of the first sensor type and the second sensor type. In another example, the processor may be configured to identify the first sensor type and the second sensor type based at least in part on user-provided searching or filtering criteria descriptive of the first sensor type and the second sensor type.

As previously mentioned, sensor types that are similar to each other, such as the first sensor type and the second sensor type identified in step/operation 502, may refer to sensor types of sensors 106 that are configured to perform the same, similar, and/or analogous sensing operations, for example, by virtue of monitoring the same or analogous values associated with the operational system 150 and/or serving analogous roles within the operational system 150. Sensor types that are similar to each other may share a common primary characteristic (e.g., being a "temperature sensor") while having distinguishing secondary characteristics with respect to each other. For example, sensors 106 of multiple different sensor types that are similar to each other may all be configured to monitor ambient air temperature, even though secondary characteristics of the different sensor types may differ with respect to each other.

Sensor makes that are different with respect to each other, such as the sensor make of the first sensor type and the sensor make of the second sensor type identified in step/operation 502, may refer to different structures, sensing mechanisms, manufacturers, sensing protocols, communication protocols, and/or versions or dates of manufacture of the sensors 106 of the different sensor makes. Sensors 106 of similar sensor types (e.g., all configured to monitor the same or analogous values and/or serve analogous roles within the operational system 150) may be of different sensor makes. For example, the operational system 150 may comprise temperature sensors performing analogous roles with respect to each other (e.g., temperature sensing) that are produced by different manufacturing entities and/or have different structures and/or sensing mechanisms for temperature sensing.

At step/operation 504 of the process 500, a processor (such as, but not limited to, the processor 202 of the sensor profiling apparatus 200 described above in connection with FIG. 2) retrieves a sensor characteristic profile of the stored one or more sensor characteristic profiles for each of the first sensor type and the second sensor type. For example, the processor may be configured to, using sensor type information (e.g., sensor type identifiers) for the first sensor type and the second sensor type as an input parameter, perform a lookup operation with respect to the stored one or more sensor characteristic profiles, returning a sensor characteristic profile with sensor type information corresponding to and/or matching the first sensor type and a sensor characteristic profile with sensor type information corresponding to and/or matching the second sensor type.

At step/operation 506 of the process 500, a processor (such as, but not limited to, the processor 202 of the sensor profiling apparatus 200 described above in connection with FIG. 2) compares the sensor characteristic profiles retrieved in step/operation 504 for the first sensor type and the second sensor type and evaluates the compared sensor characteristic profiles against each other. More particularly, the processor may be configured to compare and evaluate the sensor data signatures of the retrieved sensor characteristic profiles for the first and second sensor types against each other. In one example, the comparison and/or evaluation of the sensor data signatures of the first sensor type and the second sensor type may be performed based at least in part on configuration information and/or input received via the input/output mechanisms of the input/output circuitry 206 of the sensor profiling apparatus 200 (e.g., user-configured analysis criteria).

At step/operation 508 of the process 500, a processor (such as, but not limited to, the processor 202 of the sensor profiling apparatus 200 described above in connection with FIG. 2) generates the sensor information based at least in part on the comparison and evaluation of the retrieved sensor characteristic profiles (e.g., the sensor data signatures of the first and second sensor types) performed in step/operation 506. Here, the sensor information generated by the processor may comprise comparison information indicating similarities and/or differences in functionality and/or characteristics between the first sensor type and the second sensor type. The sensor information generated by the processor may comprise evaluation information indicating comparative performance of the first and second sensor types with respect to each other, including a comparison of the sensor types' accuracy, precision, consistency, reliability, suitability for one or more sensing tasks with respect to the operational system 150, and/or durability (e.g., over time), to list a few examples. The processor may be configured to generate the comparison information and evaluation information based at least in part on configuration information and/or input received via the input/output mechanisms of the input/output circuitry 206 of the sensor profiling apparatus 200 (e.g., user-configured analysis criteria).

Figure 6:
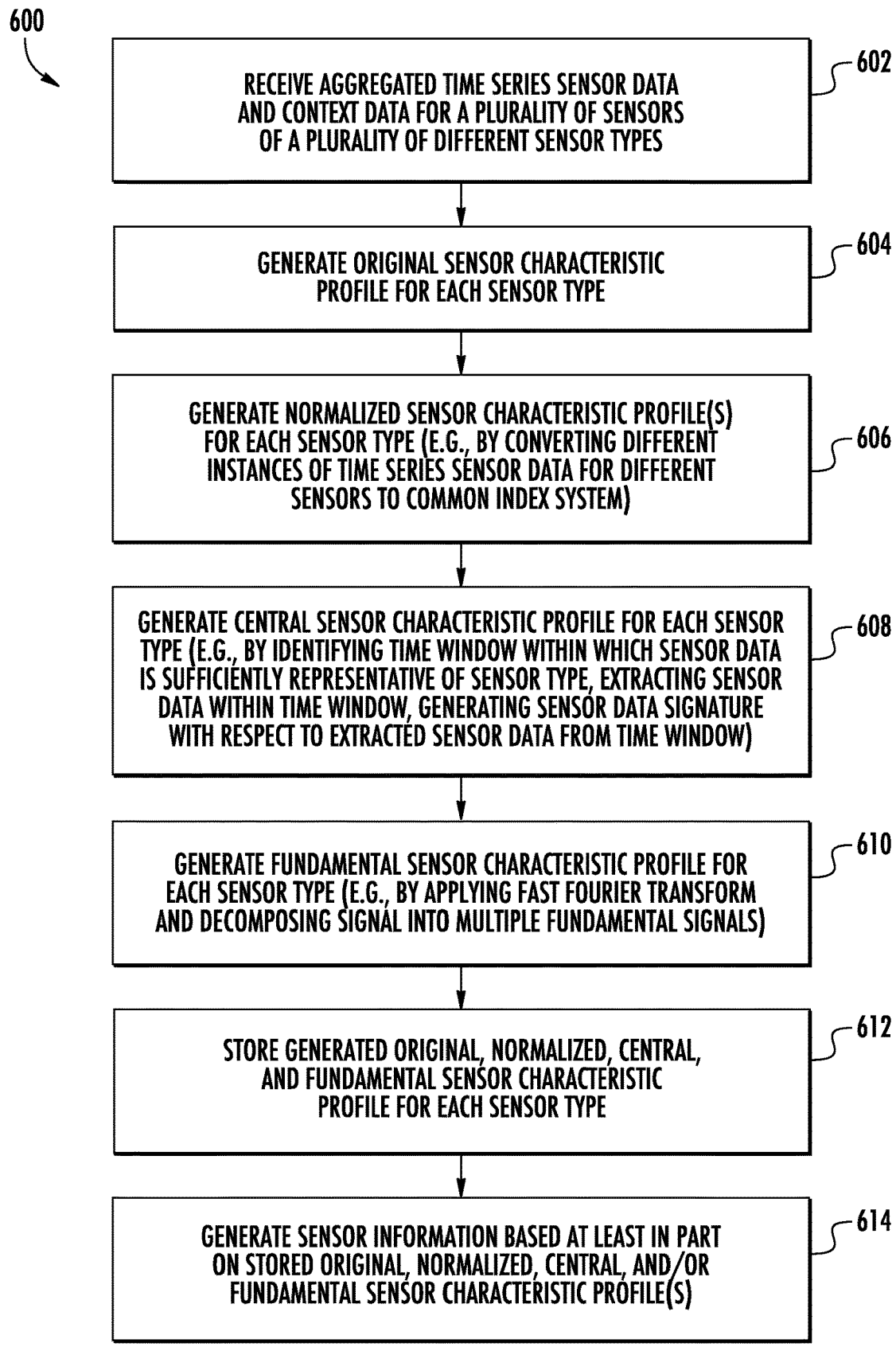
FIG. 6 illustrates a flowchart including operational blocks of an example process for sensor profiling, providing details about how sensor characteristic profiles may be generated according to some embodiments of the present disclosure.

FIG. 6 illustrates a flowchart including operational blocks of an example process for sensor profiling, in accordance with at least some example embodiments of the present disclosure. Specifically, FIG. 6 depicts steps or operations of an example process 600, providing additional details of how the one or more sensor characteristic profiles may be generated (e.g., as depicted and described with respect to step/operation 304).

The process 600 begins at step/operation 602, at which a processor (such as, but not limited to, the processor 202 of the sensor profiling apparatus 200 described above in connection with FIG. 2) receives the aggregated time series sensor data and context data for the plurality of sensors 106 of the plurality of different sensor types (e.g., as depicted and described with respect to step/operation 302).

In examples, the one or more sensor characteristic profiles generated for each sensor type of the plurality of sensor types (e.g., in step/operation 302 of the process 300) may include one or more original profiles, one or more normalized profiles, one or more central characteristic profiles, and/or one or more fundamental characteristic profiles.

Accordingly, at step/operation 604 of the process 600, a processor (such as, but not limited to, the processor 202 of the sensor profiling apparatus 200 described above in connection with FIG. 2) generates an original sensor characteristic profile for each sensor type based at least in part on the received aggregated time series sensor data. The original sensor characteristic profile for a particular sensor type may comprise sensor type information identifying the particular sensor type along with one or more sets of time series sensor data from all sensors 106 of the particular sensor type or a selected subset of sensors 106 from the particular sensor type. The original sensor characteristic profile may comprise characteristic information concerning the particular sensor type, which may be derived based at least in part on the sensor data collected from the plurality of individual sensors 106 of the particular sensor type. The original sensor characteristic profile may comprise an original sensor data signature, which may refer to a data object that describes sensor data collected from a plurality of individual sensors 106 of the particular sensor type, the described sensor data being representative of the particular sensor type and/or individual sensors 106 of the particular sensor type. The original sensor data signature may describe the sensor data from the sensors 106 of the particular sensor type in its original form (e.g., before transformation and/or truncation of the sensor data resulting from, for example, normalizing, extracting central characteristics, and/or decomposing of the sensor data, to list a few examples), including possibly distinguishing patterns (e.g., over time) detected within the sensor data for the particular sensor type. In one example, the processor may be configured to generate the original sensor characteristic profile for a particular sensor type by extracting from the full body of aggregated time series sensor data only that sensor data known to be from sensors 106 of the particular sensor type and not including sensor data known to be from sensors 106 of sensor types other than the particular sensors types or sensor data from sensors 106 of unknown sensor types. This extraction may be based at least in part on analysis of the sensor data with respect to the context data received and/or stored by the processor. The sensor data signature of the original sensor characteristic profile may comprise all of the extracted sensor data known to be from sensors 106 of the particular sensor type, in its original form, and may describe distinguishing patterns associated with the particular sensor type, the distinguishing patterns being represented, for example, by one or more wave forms of the sensor data signature (and/or one or more data series indicative of such wave forms).

At step/operation 606 of the process 600, a processor (such as, but not limited to, the processor 202 of the sensor profiling apparatus 200 described above in connection with FIG. 2) generates the one or more normalized profiles (e.g., one or more normalized sensor characteristic profiles for each sensor type) based at least in part on the received aggregated time series sensor data (and/or based at least in part on the original sensor characteristic profiles). The processor may be configured to generate the one or more normalized sensor characteristic profiles by converting instances of time series sensor data (e.g., sensor data produced by different individual sensors 106 to be used in generating the sensor data signature, sensor data of the sensor characteristic profile) to a common index system. For example, the instances of time series sensor data pertaining to the sensor types (and thus to sensor characteristic profiles being generated for the sensor types) may comprise timestamps expressed as absolute values (e.g., a calendar date and/or time, a computer system date and/or time), and different instances of time series sensor data may have different starting times (e.g., timestamps for a first sensor value in the data series), different ending times (e.g., timestamps for a last sensor value in the data series), and/or inconsistent distributions of sensor values within the window of time delineated by the starting times and ending times (e.g., inconsistently spaced time increments between each sensor value) with respect to each other. The processor may be configured to generate a normalized sensor characteristic profile (e.g., comprising a normalized sensor data signature) by converting these instances of time series sensor data to a common index system. In one example, the processor may be configured to generate a normalized sensor characteristic profile by converting the absolute values of the timestamps of the sensor data signature generated for the sensor characteristic profile into a standardized index system (e.g., expressed as sequential integers) that is common across all normalized sensor data signatures (e.g., sensor data signatures of normalized sensor characteristic profiles, normalized sample sensor data signatures).

At step/operation 608 of the process 600, a processor (such as, but not limited to, the processor 202 of the sensor profiling apparatus 200 described above in connection with FIG. 2) generates the one or more central characteristic profiles (e.g., one or more central sensor characteristic profiles for each sensor type) based at least in part on the received aggregated time series sensor data (and/or based at least in part on the original sensor characteristic profiles). The processor may be configured to generate the one or more central sensor characteristic profiles for a sensor type by identifying a time window within which sensor data for sensors 106 of the sensor type is sufficiently representative of the sensor type, extracting sensor data within the identified time window for the sensors 106 of the sensor type, and generating the sensor data signature of the central sensor characteristic profile with respect to the extracted sensor data from within the identified time window. In various embodiments, generating the sensor data signature of the central sensor characteristic profile for a particular sensor type may comprise determining one or more windows of time within the aggregated time series sensor data from the sensors 106 of the particular sensor type within which distinguishing patterns (e.g., over the duration of the determined window of time) in the sensor values may be sufficiently prevalent across individual sensors 106 of the particular sensor type and/or sufficiently distinctive with respect to sensor data collected from individual sensors 106 not of the particular sensor type so that the sensor data for the determined window of time may be used to generate the sensor data signature and/or included in the sensor data signature for the particular sensor type. In this way, the sensor data signature of the central sensor characteristic profile may comprise and/or describe only a representative subset or "snapshot" of the time series sensor data for the particular sensor type, namely only those sensor values (e.g., from individual and/or combined sensor data from the sensors 106 of the particular sensor type) within the determined window of time.

At step/operation 610 of the process 600, a processor (such as, but not limited to, the processor 202 of the sensor profiling apparatus 200 described above in connection with FIG. 2) generates the one or more fundamental characteristic profiles (e.g., one or more fundamental sensor characteristic profiles for each sensor type) based at least in part on the received aggregated time series sensor data (and/or based at least in part on the original sensor characteristic profiles). The processor may be configured to generate the one or more fundamental sensor characteristic profiles for a sensor type by applying a fast Fourier transform (FFT) process or algorithm to the time series sensor data and/or the sensor data signature for the sensor type and decomposing a signal expressed within the time series sensor data and/or sensor data signature into multiple fundamental signals (e.g., in the frequency domain), which may be included as one or more fundamental sensor data signatures of the fundamental sensor characteristic profile. The processor may be configured to generate a fundamental sensor data signature of the fundamental sensor characteristic profile for a particular sensor type by generating a first sensor data signature based at least in part on the individual and/or combined sensor data from sensors 106 of the particular sensor type (e.g., as depicted and described with respect to steps/operations 304 and/or 608), executing, using the first sensor data signature as an input parameter, an FFT process or algorithm on the signal represented in the first sensor data signature in order to generate a subsequent (with respect to the first sensor data signature) fundamental sensor data signature of the fundamental sensor characteristic profile, the fundamental sensor data signature describing distinguishing patterns (e.g., within the frequency domain) of the sensor data for the particular sensor type, which may be represented, for example, as one or more wave forms of the fundamental sensor data signature (and/or one or more data series indicative of such wave forms).

At step/operation 612 of the process 600, a processor (such as, but not limited to, the processor 202 of the sensor profiling apparatus 200 described above in connection with FIG. 2) stores the one or more sensor characteristic profiles (as in step/operation 312), including the original sensor characteristic profiles (e.g., generated in step/operation 604), the normalized sensor characteristic profiles (e.g., generated in step/operation 606), the central sensor characteristic profiles (e.g., generated in step/operation 608), and the fundamental sensor characteristic profiles (e.g., generated in step/operation 610) in one or more data repositories, such as a sensor type profile database (e.g., stored in the data repository 102B of the sensor profiling system 102 and/or the memory 204 of the sensor profiling apparatus 200).

At step/operation 614 of the process 600, a processor (such as, but not limited to, the processor 202 of the sensor profiling apparatus 200 described above in connection with FIG. 2) generates the sensor information (as in step/operation 314 of the process 300, step/operation 408 of the process 400, and/or step/operation 508 of the process 500) based at least in part on the original sensor characteristic profiles (e.g., generated in step/operation 604), the normalized sensor characteristic profiles (e.g., generated in step/operation 606), the central sensor characteristic profiles (e.g., generated in step/operation 608), and the fundamental sensor characteristic profiles (e.g., generated in step/operation 610).

Figure 7:
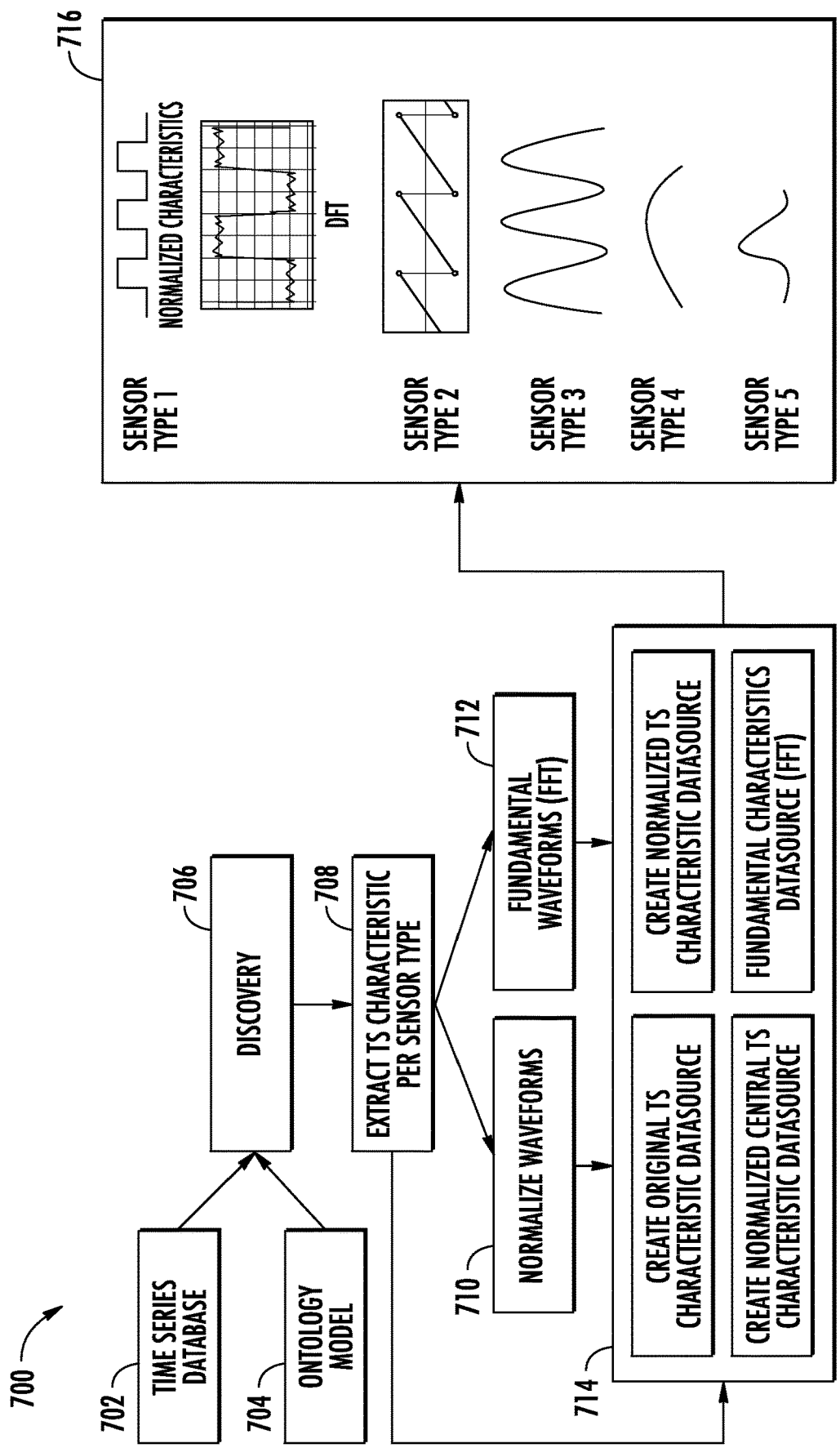
FIG. 7 illustrates a flowchart including operational blocks of an example process for sensor profiling, providing details about how sensor characteristic profiles may be generated according to some embodiments of the present disclosure.

FIG. 7 is an illustration of an example process for sensor profiling, in accordance with at least some example embodiments of the present disclosure. Specifically, FIG. 7 depicts steps or operations of an example process 700 with reference to schematic depictions of example data objects used by and/or produced by the various steps or operations, providing additional details of how the one or more sensor characteristic profiles may be generated and stored (e.g., as depicted and described with respect to step/operation 304 and/or 312 of the process 300 and steps/operations 604, 606, 608, 610, and/or 612 of the process 600).

At step/operation 706 of the process 700, a processor (such as, but not limited to, the processor 202 of the sensor profiling apparatus 200 described above in connection with FIG. 2) performs a discovery process with respect to different sources of data concerning the sensors 106 available to the processor, namely a time series database 702 and an ontology model 704. The time series database 702 may be a repository for storing the aggregated time series sensor data (e.g., stored by the data repository 102B of the sensor profiling system and/or the memory 204 of the sensor profiling apparatus 200), which may be the aggregated time series sensor data received as depicted and described with respect to step/operation 302 of the process 300 and/or step/operation 602 of the process 600. The ontology model 704 may be an instance or portion of the context data for the plurality of sensors 106 as depicted and described with respect to step/operation 302 of the process 300 and/or step/operation 602 of the process 600 and may comprise one or more representations of each of the various components of one or more operational systems 150 (e.g., sensors 106, operational devices 104, functional subsystems 108), classification of the components into various categories (e.g., sensor types, device types, sensor makes, virtual sensors, virtual sensor types), definitions of various attributes of the components and/or categories, and/or definition of relationships between the components and/or categories. The discovery process performed in step/operation 706 may comprise cross referencing sensor identification information and/or sensor type information, or any other information, included in the aggregated time series sensor data (e.g., associated with each set of sensor data, identifying the sensor 106 that produced the set of sensor data and/or a sensor type of the identified sensor 106) with analogous information included in the ontology model 704 and, based at least in part on the cross-referencing of the aggregated time series sensor data with the ontology model 704, detecting, characterizing, generating, extracting, and/or storing characteristics information for the sensors 106, sensor types, operational devices 104, device types, functional subsystems 108, virtual sensors, and/or one or more operational systems 150. The characteristics information may be based at least in part on and/or comprise patterns, such as distinguishing patterns within the sensor data, seasonality information, trend information, and/or any other type of information determined from the discovery process. The discovery process of step/operation 706 may further comprise organizing the aggregated time series sensor data by sensor types of sensors 106 from which the aggregated time series sensor data originates based at least in part on the information provided in the ontology model 704 (e.g., by grouping and/or combining the sensor data for all sensors 106 of a sensor type, for each sensor type, and/or labeling the sensor data according to sensor types of the sensors 106 that produced the sensor data).

At step/operation 708 of the process 700, a processor (such as, but not limited to, the processor 202 of the sensor profiling apparatus 200 described above in connection with FIG. 2) extracts, for each sensor type, characteristics information associated with the sensor type and/or sensor data from the aggregated time series sensor data produced by sensors 106 of the sensor type. In general, this extracted information associated with each sensor type may be used to generate the one or more sensor characteristic profiles (e.g., as depicted and described with respect to step/operation 304 of the process 300 and steps/operations 604, 606, 608, and/or 610).

At step/operation 710 of the process 700, a processor (such as, but not limited to, the processor 202 of the sensor profiling apparatus 200 described above in connection with FIG. 2), for each particular sensor type, performs a normalization process or algorithm with respect to the information extracted in step/operation 708, namely the extracted sensor data produced by the sensors 106 of the particular sensor type. The processor may be configured to perform the normalization process or algorithm in the manner described with respect to step/operation 606 of the process 600. For example, the processor may generate a normalized set of sensor data (e.g., comprising or indicative of normalized wave forms) based at least in part on the extracted sensor data by converting instances of time series sensor data within the extracted sensor data to a common index system (e.g., converting the absolute values of the timestamps of the extracted sensor data into a standardized index system that is common across all normalized sensor data). In general, this normalized sensor data may be used to generate the one or more sensor characteristic profiles (e.g., as depicted and described with respect to step/operation 304 of the process 300 and steps/operations 606 and 608 of the process 600).

At step/operation 712 of the process 700, a processor (such as, but not limited to, the processor 202 of the sensor profiling apparatus 200 described above in connection with FIG. 2), for each particular sensor type, generates one or more fundamental wave forms based at least in part on the information extracted in step/operation 708, namely the extracted sensor data produced by the sensors 106 of the particular sensor type. The processor may be configured to generate the one or more fundamental wave forms in the manner described with respect to step/operation 610 of the process 600. For example, the processor may apply an FFT process or algorithm to the extracted sensor data produced by the sensors 106 of the particular sensor type and decompose a signal expressed within the extracted sensor data into multiple fundamental signals (e.g., in the frequency domain). In general, these fundamental signals generated from the sensor data may be used to generate the one or more sensor characteristic profiles (e.g., as depicted and described with respect to step/operation 304 of the process 300 and step/operation 610 of the process 600).

At step/operation 714 of the process 700, a processor (such as, but not limited to, the processor 202 of the sensor profiling apparatus 200 described above in connection with FIG. 2), for each particular sensor type, generates and stores one or more sensor characteristic profiles for the particular sensor type (e.g., as depicted and described with respect to step/operation 304 and/or 312 of the process 300 and steps/operations 604, 606, 608, 610, and/or 612 of the process 600).

More particularly, at step/operation 714, the processor may be configured to generate an original sensor characteristic profile (e.g., as depicted and described with respect to step/operation 604 of the process 600) for each particular sensor type based at least in part on and/or comprising the extracted information from step/operation 708 in its original form (before any transformations and/or conversions from steps/operations 710 and/or 712). For example, the original sensor characteristic profile generated for each sensor may comprise sensor type information (e.g., a sensor type identifier) associated with the extracted characteristics information (and/or a reference thereto), the extracted sensor data produced by the sensors 106 of the particular sensor type, and/or an original sensor data signature.

At step/operation 714, the processor may be configured to generate a normalized sensor characteristic profile (e.g., as depicted and described with respect to step/operation 606 of the process 600) for each particular sensor type based at least in part on and/or comprising a portion of the extracted information from step/operation 708 along with the normalized set of sensor data (e.g., comprising or indicative of normalized wave forms) generated in step/operation 710. For example, the normalized sensor characteristic profile for each sensor may comprise sensor type information (e.g., a sensor type identifier) associated with the extracted characteristics information (and/or a reference thereto), the normalized set of sensor data from the sensors 106 of the particular sensor type, and/or a normalized sensor data signature (e.g., generated based at least in part on the normalized set of sensor data).

At step/operation 714, the processor may be configured to generate a central sensor characteristic profile (e.g., as depicted and described with respect to step/operation 608 of the process 600) for each particular sensor type based at least in part on and/or comprising a portion of the extracted information from step/operation 708 along with possibly the normalized set of sensor data (e.g., comprising or indicative of normalized wave forms) generated in step/operation 710. Here, the processor may be configured to identify a time window within which the normalized sensor data for sensors 106 of the particular sensor type is sufficiently representative of the sensor type, extract the normalized sensor data from within the identified time window for the sensors 106 of the sensor type, and generate the sensor data signature of the central sensor characteristic profile with respect to the extracted normalized sensor data from within the identified time window. For example, the central sensor characteristic profile for each sensor may be specifically a normalized central sensor characteristic profile comprising sensor type information (e.g., a sensor type identifier) associated with the extracted characteristics information (and/or a reference thereto), the normalized set of sensor data from the sensors 106 of the particular sensor type extracted from the identified time window, and/or a central normalized sensor data signature (e.g., generated based at least in part on the set of extracted normalized sensor data from within the identified window of time).

All variations of the sensor characteristic profiles for each sensor type generated in step/operation 714 (e.g., the original sensor characteristic profile, the normalized sensor characteristic profile, the central characteristic profile, and the fundamental characteristic profile) may be stored, and any of the variations may be used to generate the sensor information (e.g., as depicted and described with respect to step/operation 314 of the process 300) as desired according to the suitability of the variation to a particular monitoring, maintenance, assessment, evaluation, and/or analysis task with which the generated sensor information is associated.

Moreover, as previously described, the resulting sensor characteristic profiles 716 (e.g., generated and stored in step/operation 714) may comprise a sensor data signature, which may describe the sensor data (and any distinguishing characteristics thereof) that was extracted for each sensor type in step/operation 708, normalized in step/operation 710, transformed in step/operation 712, and/or truncated (e.g., extracted from an identified time window within the sensor data in generating the central characteristic profile), for example, by representing the described sensor data (and any distinguishing characteristics thereof) as a wave form of the sensor data signature (and/or a data series indicative of such a wave form). In the illustrated example of FIG. 7, the sensor characteristic profiles 716 include sensor data signatures for a set of five sensor types, which each of the sensor data signatures being represented by a distinct wave form, which can be distinguished from wave forms of the sensor data signatures of the other sensor types.

Figure 8:
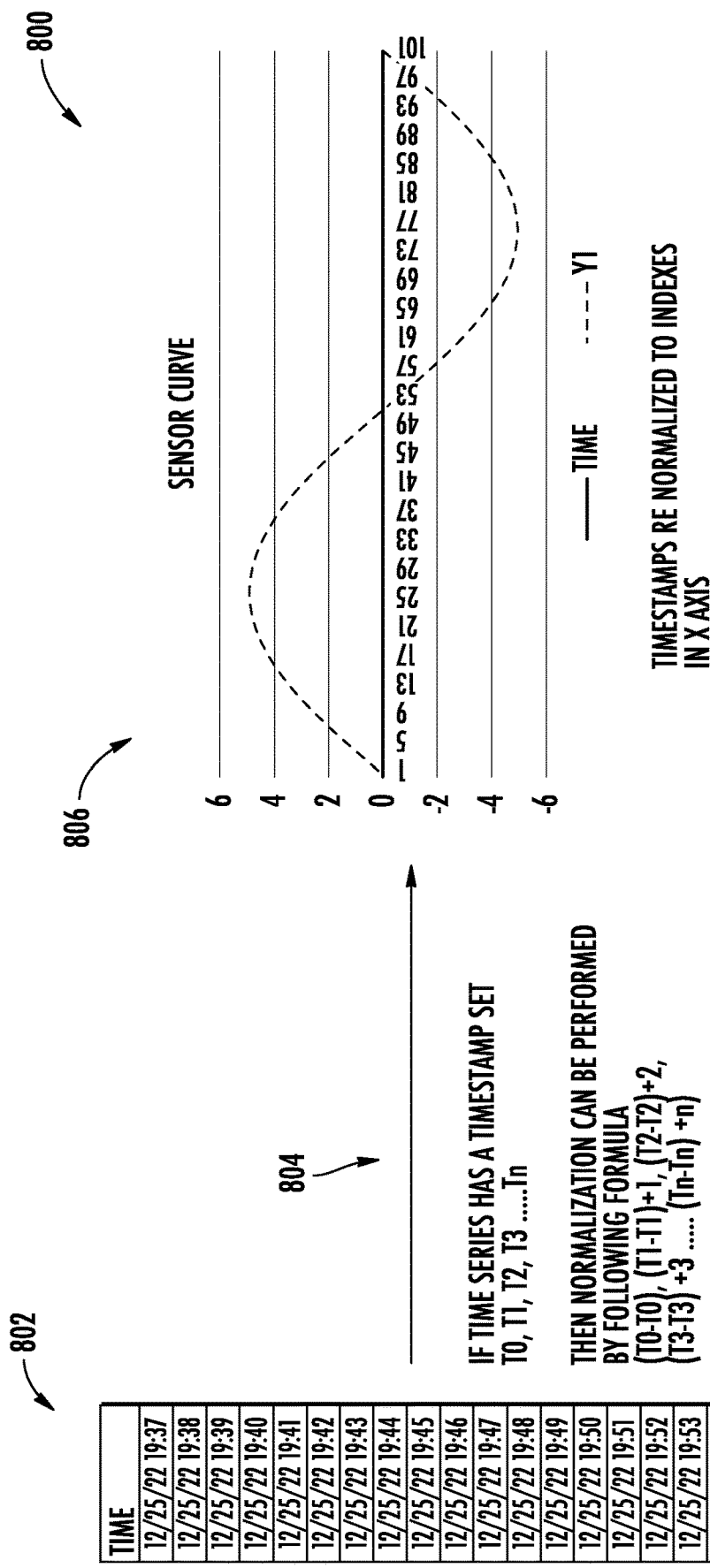
FIG. 8 is an illustration of an example normalization process sensor data and/or sensor data signatures, according to some embodiments of the present disclosure.

FIG. 8 is an illustration of an example normalization process 800 for the sensor data and/or sensor data signatures, such as that depicted and described with respect to step/operation 606 of the process 600 and/or step/operation 710 of the process 700.

In the illustrated example, an original time series sensor data set 802 comprises a series of sensor values (not illustrated), each of which is associated with a timestamp indicating a time associated with the sensor value (e.g., a time at which the sensor value was produced by the sensor 106). The timestamps are expressed as absolute values representing specific times, for example, by including digits or values indicating a month, digits or values indicating a day within the indicated month, digits or values indicating a calendar year, digits or values indicating an hour within the indicated day, and digits or values indicating a minute within the indicated hour.

Although these timestamps provide precise information concerning absolute times at which the sensor values were generated, in certain situations, the timestamps present a number of challenges. For example, different instances of time series sensor data may have different starting times (e.g., timestamps for a first sensor value in the data series), different ending times (e.g., timestamps for a last sensor value in the data series), and/or inconsistent distributions of sensor values within the window of time delineated by the starting times and ending times (e.g., inconsistently spaced time increments between each sensor value) with respect to each other. When comparing and/or combining these different instances of time series sensor data, it is often necessary perform an alignment process with respect to the different instances of sensor data based on the absolute values of the timestamps. Normalizing the instances of sensor data and storing sensor data signatures including or based on the normalized sensor data allows sensor data signatures to be compared and/or combined relatively quickly and simply without the need to perform a complex alignment of sensor data sets being compared.

Accordingly, the normalization process 800 (e.g., as depicted and described with respect to step/operation 606 of the process 600 and/or step/operation 710 of the process 700) may comprise converting an instance of time series sensor data to a common index system by transforming absolute time values of a sensor data set to index values of a standardized index system (e.g., expressed as sequential integers) according to a normalization formula 804. As shown in the illustrated example, an example time series data set having a set of timestamps $T_0, T_1, T_2, T_3 \ldots T_n$. can may be converted to a common index system according to the following formula: $(T_0-T_0)$, $(T_1-T_1)+1$, $(T_2-T_2)+2$, $(T_3-T_3)+3 \ldots (T_n-T_n)+n$, resulting in a normalized set of timestamps 0, 1, 2, 3 . . . n. A normalized wave form 806 indicated by the resulting normalized time series data is shown in the graph provided in the illustrated example, with a series of sensor values of the normalized sensor data being expressed with respect to a series of sequential integers indicated along an x-axis of the graph.

Figure 9:
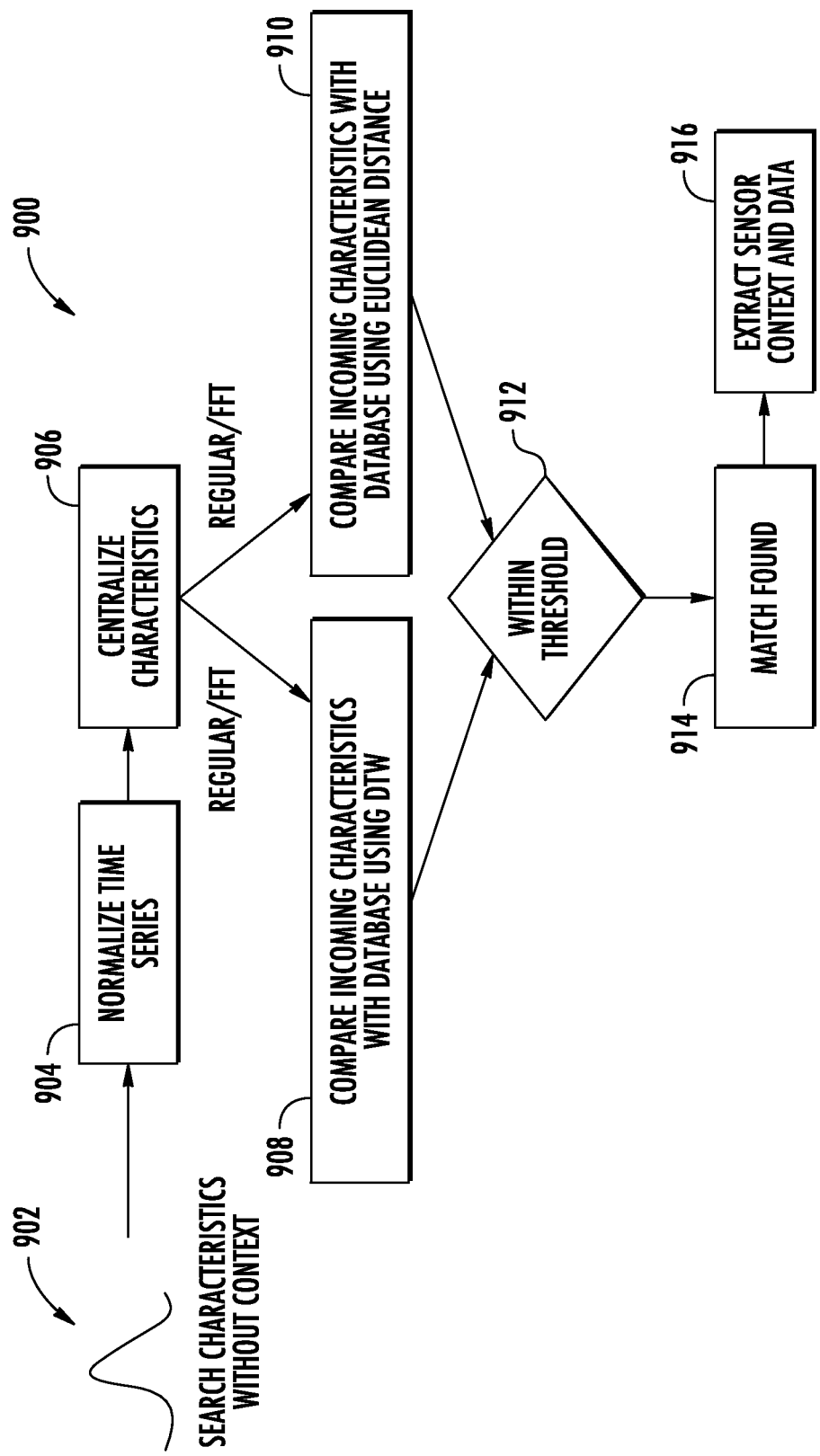
FIG. 9 illustrates a flowchart including operational blocks of an example process for sensor profiling, providing details about how sensor information may be generated based at least in part on stored sensor characteristic profiles according to some embodiments of the present disclosure.

FIG. 9 is an illustration of an example process for sensor profiling, in accordance with at least some example embodiments of the present disclosure. Specifically, FIG. 9 depicts steps or operations of an example process 900 with reference to schematic depictions of example data objects used by the various steps or operations, providing additional details of how the sensor information may be generated based at least in part on the stored one or more sensor characteristic profiles (e.g., as depicted and described with respect to step/operation 314 of the process 300, step/operation 408 of the process 400, and/or step/operation 614 of the process 600).

In general, the process 900 is performed with respect to one or more search parameters indicative of characteristics of and/or distinguishing patterns within a time series data set. For example, the one or more search parameters may comprise sample sensor data 902 from a particular sensor 106, such as the sample sensor data 902 defined and described with respect to step/operation 402 of the process 400.

At step/operation 904 of the process 900, a processor (such as, but not limited to, the processor 202 of the sensor profiling apparatus 200 described above in connection with FIG. 2) normalizes the sample sensor data 902, for example, by converting the sample sensor data 902 to a common index system (e.g., with respect to other normalized time series data sets, such as those of the sensor data signatures of the stored one or more sensor characteristic profiles). Here, the processor may be configured to perform the normalization process as depicted and described with respect to step/operation 606 of the process 600, step/operation 710 of the process 700, and/or the example normalization process 800 illustrated in FIG. 8.

At step/operation 906 of the process 900, a processor (such as, but not limited to, the processor 202 of the sensor profiling apparatus 200 described above in connection with FIG. 2) determines a sample sensor data signature for the particular sensor 106, the sample sensor data signature being indicative of central characteristics of the sample sensor data 902, for example by identifying a time window within which the sample sensor data is sufficiently representative of the particular sensor 106 that produced the sample sensor data, extracting the sample sensor data within the identified time window, and generating the sample sensor data signature with respect to the extracted sample sensor data. Here, the processor may be configured to determine central characteristics of the sample sensor data and/or generate a (central) sample sensor data signature based on the determined central characteristics in a manner similar to that depicted and described with respect to step/operation 608 of the process 600, and/or step/operation 714 of the process 700.

Generally, the same or similar processes as those described herein for generating normalized and/or central sensor characteristic profiles and/or signatures may be applied to the sample sensor data received from the particular sensor 106.

Moreover, steps/operations 904 and/or 906 may correspond generally to step/operation 404 of the process 400. For example, steps/operations 904 and/or 906 may be examples of how step/operation 404 may be performed.

At steps/operations 908 and 910 of the process 900, a processor (such as, but not limited to, the processor 202 of the sensor profiling apparatus 200 described above in connection with FIG. 2) compares the sample sensor data signature (e.g., indicating the central characteristics determined from the sample sensor data from the particular sensor 106) to sensor data signatures of the stored one or more sensor characteristic profiles for each sensor type (e.g., to the normalized central sensor data signatures). For a given sample sensor data signature being searched, one or both of steps/operations 908 and 910 may be performed in parallel, in sequence, and/or alternatively. More particularly, at step/operation 908, the processor compares the sample sensor data signature to the sensor data signatures of the stored one or more sensor characteristic profiles by applying a dynamic time warping (DTW) process or algorithm. At step/operation 910, the processor compares the sample sensor data signature to the sensor data signatures of the stored one or more sensor characteristic profiles by applying a Euclidean distance algorithm. In either case, the processor may be configured to generate one or more match scores, each of which may be indicative of an extent to which a time series described by the sample sensor data signature matches or is similar to a time series described by the stored sensor data signature.

At step/operation 912 of the process 900, a processor (such as, but not limited to, the processor 202 of the sensor profiling apparatus 200 described above in connection with FIG. 2) determines whether the one or more match scores generated in steps/operations 908 and/or 910 are within a predetermined matching threshold.

At step/operation 914 of the process 900, a processor (such as, but not limited to, the processor 202 of the sensor profiling apparatus 200 described above in connection with FIG. 2) determines that one or more matches have been found in response to determining that one or more of the match scores (e.g., generated in steps/operations 908 and/or 910) is within the predetermined matching threshold.

In one example, at step/operation 912, the processor may be configured to select a match score (of the one or more match scores generated in steps/operations 908 and/or 910) indicative of the closest match or highest degree of similarity between the sample sensor data signature and a stored sensor data signature and to determine whether the selected match score is within the predetermined matching threshold. At step/operation 914, the processor may determine that the sample sensor data signature matches a particular stored sensor data signature in response to determining that the match score calculated with respect to the sample sensor data signature and the particular stored sensor data signature, which was selected as being indicative of the closest match or highest degree of similarity and evaluated against the predetermined matching threshold in step/operation 912, is within the predetermined matching threshold.

In another example, at step/operation 912, the processor may be configured to determine whether each of the one or more match scores generated in steps/operations 908 and/or 910 is within the predetermined matching threshold. At step/operation 914, the processor may determine that one or more of the stored sensor data signatures matches the sample sensor data signature, for example, by determining that any match score being within the predetermined matching threshold is indicative of a match. In this case, the processor may return more than one match.

At step/operation 916 of the process 900, a processor (such as, but not limited to, the processor 202 of the sensor profiling apparatus 200 described above in connection with FIG. 2) generates, retrieves, returns, and/or presents sensor information pertaining to any sensor type associated with a sensor data signature determined in step/operation 914 to match that of the sample sensor data signature 902. For example, the processor may be configured to extract from stored context data any information relevant to or referencing one or more sensor types whose stored sensor data signature matches the sample sensor data signature 902, including any portion of the context data and/or the matching sensor characteristic profile, including sensor type information and/or characteristic information.

Figure 10:
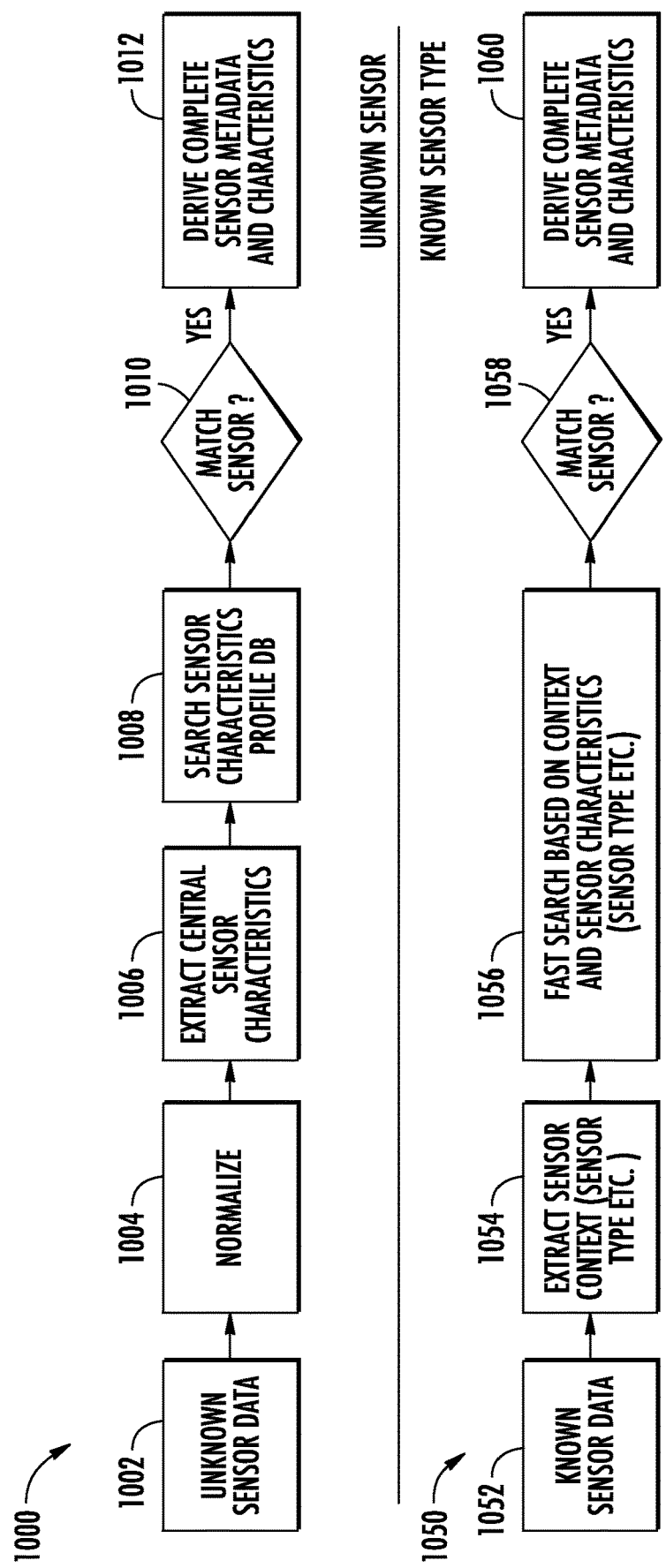
FIG. 10 illustrates a flowchart including operational blocks of example processes for sensor profiling, providing details about how sensor information may be generated based at least in part on stored sensor characteristic profiles according to some embodiments of the present disclosure.

FIG. 10 is an illustration of example processes for sensor profiling, in accordance with at least some example embodiments of the present disclosure. Specifically, FIG. 10 depicts steps or operations of an example process 1000 and an example process 1050 with reference to schematic depictions of example data objects used by the various steps or operations, providing additional details of how the sensor data may be generated based at least in part on the stored one or more sensor characteristic profiles (e.g., as depicted and described with respect to step/operation 314 of the process 300, step/operation 408 of the process 400, step/operation 614 of the process 600, and/or the process 900).

As in the process 900, the processes 1000 and 1050 are performed with respect to one or more search parameters indicative of characteristics of and/or distinguishing patterns within a time series data set. For example, the one or more search parameters may comprise sample sensor data from a particular sensor 106, such as the sample sensor data defined and described with respect to step/operation 402 of the process 400.

Now, however, the sample sensor data for the different processes 1000, 1050 is specifically unknown sample sensor data 1002 (e.g., from an unidentified sensor 106 and/or a sensor of an unknown sensor type) and known sample sensor data 1052 (e.g., from a sensor 106 for which sufficient context data is available to identify and/or classify the sensor 106).

In general, the unknown sample sensor data 1002 is processed as described with respect to the process 900. In particular, at step/operation 1004 of the process 1000, a processor (such as, but not limited to, the processor 202 of the sensor profiling apparatus 200 described above in connection with FIG. 2) normalizes the unknown sample sensor data 1002 (as in step/operation 904 of the process 900). At step/operation 1006, the processor extracts the central sensor characteristics and/or generates the sample sensor data signature (as in step/operation 906 of the process 900). At step/operation 1008, the processor searches the sensor profile database by comparing the sample sensor data signature for the unknown sample sensor data 1002 to the sensor data signatures of the stored one or more sensor characteristic profiles (as in steps/operations 908 and/or 910 of the process 900). At step/operation 1010, the processor determines whether any of the stored sensor data signatures matches the sample sensor data signature for the unknown sample data signature 1002. At step/operation 1012, in response to determining that one or more of the stored sensor data signatures matches the sample sensor data signature for the unknown sample sensor data 1002, the processor derives complete sensor metadata (e.g., sensor type information) and/or sensor characteristics information for the unknown sensor 106 from stored context data and/or the stored sensor characteristic profile with the sensor data signature matching the sample sensor data signature for the unknown sample sensor data 1002 (as in steps/operations 914 and 916 of the process 900).

On the other hand, for the known sample sensor data 1052, a faster and/or simpler search process is possible.

At step/operation 1054 of the process 1050, a processor (such as, but not limited to, the processor 202 of the sensor profiling apparatus 200 described above in connection with FIG. 2) extracts and/or determines context data for the known sensor 106 (e.g., sensor type information). At step/operation 1056, the processor conducts a (e.g., fast) search of the sensor profile database based on the extracted and/or determined context data for the known sensor 106, for example, by comparing sensor type information of the stored sensor characteristic profiles to that extracted and/or determined for the known sensor 106. At step/operation 1058, the processor determines whether any of the stored sensor characteristic profiles have sensor type information matching that extracted and/or determined for the known sensor 106. At step/operation 1060, in response to determining one or more of the stored sensor characteristic profiles have sensor type information matching that extracted and/or determined for the known sensor 106, the processor derives complete sensor metadata and/or sensor characteristics information for the known sensor 106 from stored context data and/or the stored sensor characteristic profile with the sensor type information matching that extracted and/or determined for the known sensor 106.

Figure 11:
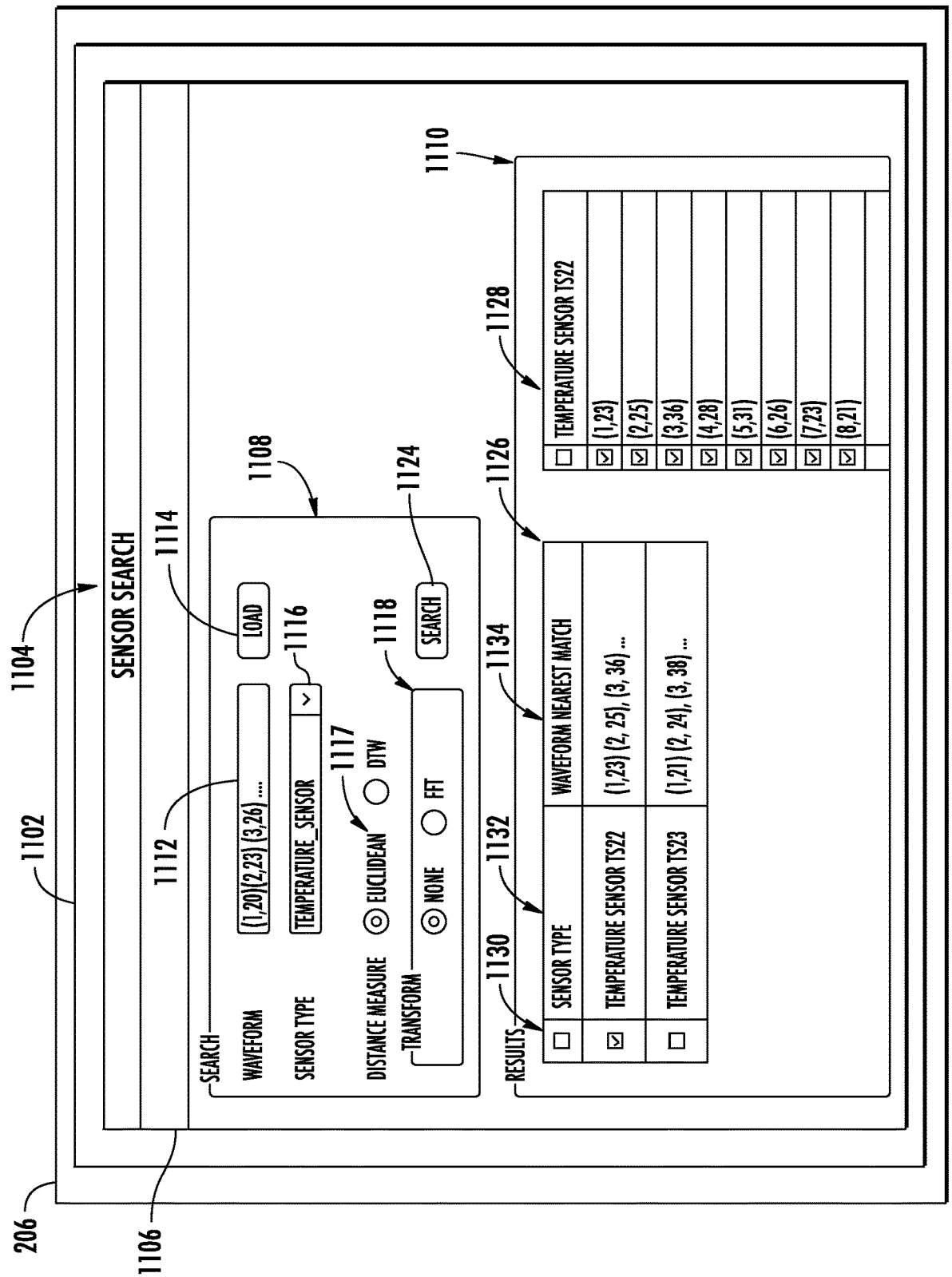
FIG. 11 illustrates an example user interface for receiving search and/or analysis criteria and presenting sensor information generated based on the received search and/or analysis criteria, in accordance with at least some example embodiments of the present disclosure.

FIG. 11 is an illustration of an exemplary graphical user interface (GUI) 1104 for sensor profiling according to at least some embodiments of the present disclosure. The GUI 1104 may be rendered on a display 1102 (e.g., of the sensor profiling apparatus 200 via the input/output circuitry 206, of the server 102A). In some example embodiments, some or all of the generated sensor information may be displayed for user(s) in any suitable display format, including but not limited to tabular and/or graphical. The example GUI 1104 may be rendered by one or more computing devices, for example the sensor profiling apparatus 200 may cause rendering of the GUI 1104 to a display or one or more client device(s) associated with the sensor profiling apparatus 200. For example, in some embodiments, the GUI 1104 may be rendered to a client device associated with a particular user to enable the user to view and/or otherwise interact with the GUI 1104.

In general, the GUI 1104 presents information such as the sensor information generated in the processes 300, 400, 500, 600, 900, 1000, and/or 1050. The GUI 1104 may include various screens, views, and/or windows for displaying the sensor information. The GUI 1104 may comprise one or more mechanisms for receiving input from a user (e.g., by detecting contact between the user and a touchscreen display in certain regions of the display, by detecting interaction by the user with one or more elements of the GUI 1104 via input devices), which may be indicative of search criteria and/or analysis criteria for processing by the sensor profiling apparatus 200 and/or sensor profiling system 100 (e.g., to generate the sensor information). The GUI 1104 may comprise various graphical elements (e.g., icons, virtual buttons, menus, textual information, information panes, images) for presenting the information and/or receiving input.

In the illustrated example, the GUI 1104 comprises a sensor search window 1106, which may comprise various graphical elements for receiving input indicative of search criteria and/or analysis criteria for processing by the sensor profiling apparatus 200 and/or sensor profiling system 100 (e.g., to generate the sensor information) and for presenting the generated sensor information. More particularly, the GUI 1104 may comprise a search parameter pane 1108 for receiving the search criteria and/or analysis criteria and a search results pane 1110 for presenting the generated sensor information, namely results of searches of the sensor profile database.

In the illustrated example, the search parameter pane 1108 comprises a sensor data signature input field 1112, a load button 1114, a sensor type input field 1116, a matching method selector 1117, a transform selector 1118, and a search button 1124.

The sensor data signature input field 1112 is a graphical element for receiving textual input (e.g., via the input/output circuitry 206) indicative of sample sensor data and/or a sample sensor data signature for a particular sensor 106 to be searched. For example, text entered into the sensor data signature input field 1112 may define time series sensor data and/or a sensor data signature indicative of a particular waveform (e.g., observed in sensor data of a particular sensor 106 such as an unknown sensor 106) to be searched for among the sensor characteristic profiles.

The load button 1114 may be a virtual button (e.g., represented by a graphical element rendered as part of the GUI 1104 and selectable by a user via an input mechanism of the GUI 1104). The GUI 1104 may be configured to load one or more selection windows, panes, and/or elements for selecting data files representing or containing the sample sensor data and/or sample sensor data signature indicative of the particular waveform to be search for. In some embodiments, in response to selection of a data file representing a set of sample sensor data and/or a sample sensor data signature and selection of the load button 1114, the GUI 1104 may be configured to populate the sensor data signature input field 1112 with textual information describing the sample sensor data and/or sample sensor data signature represented by the selected data file.

The sensor type input field 1116 may be a graphical element for receiving input indicative of a selection of a sensor type corresponding to the sample sensor data and/or the particular sensor 106 being searched. In one example, selection of a particular sensor type in the sensor type input field 1116 may indicate filtering of results returned from the search and/or a delineation of which stored sensor characteristic profiles (e.g., those of the selected sensor type) the search should be limited to.

The matching method selector 1117 may be a radio button selector for selecting which matching process or algorithm (e.g., DTW or Euclidean) to apply in performing the search. In the illustrated example, the matching method selector 1117 comprises a Euclidean radio button and a DTW radio button.

The transform selector 1118 may be a radio button selector for selecting whether to apply the FFT process to the sample sensor data being searched and/or whether to search among the stored fundamental sensor characteristic profiles.

The search button 1124 may be a virtual button for submitting selected search parameters indicated via the sensor data signature input field 1112, the load button 1114, the sensor type input field 1116, the matching method selector 1117, and/or the transform selector 1118. More particularly, in response to detecting selection of the search button 1124, the server 102A of the sensor profiling system 102 and/or the sensor profiling apparatus 200 may be configured to initiate any of the searching processes depicted and described with respect to the process 400, the process 900, the process 1000, and/or the process 1050 particularly with respect to sample sensor data selected and/or input via the sensor data signature input field 1112 and/or the load button 1114. In response to detecting selection of the search button 1124, the server 102A of the sensor profiling system 102 and/or the sensor profiling apparatus 200 may be configured limit such a search and/or filter results of such a search to a particular sensor type indicated in the sensor type input field 1116. In response to detecting selection of the search button 1124, the server 102A of the sensor profiling system 102 and/or the sensor profiling apparatus 200 may be configured to perform the search by, when the DTW radio button of the matching method selector 1117 is selected, comparing the selected sample sensor data signature to the sensor data signatures of the stored one or more sensor characteristic profiles by applying the DTW process or algorithm (e.g., as in step/operation 908 of the process 900) or, when the Euclidean radio button of the matching method selector 1117 is selected, comparing the selected sample sensor data signature to the sensor data signatures of the stored one or more sensor characteristic profiles by applying the Euclidean process or algorithm (e.g., as in step/operation 910 of the process 900). In response to detecting selection of the search button 1124, the server 102A of the sensor profiling system 102 and/or the sensor profiling apparatus 200 may be configured to, when the FFT button of the transform selector 1118 is selected, apply the FFT process (e.g., as defined and described with respect to step/operation 610 of the process 600) to the selected sample sensor data and/or sample sensor data signature and/or to perform the search specifically with respect to the stored fundamental sensor characteristic profiles (e.g., generated in step/operation 610 of the process 600 and/or in steps/operations 712 and 714 of the process 700).

In the illustrated example, the search results pane 1110 comprises a results table 1126 (which comprises a type selector column 1130, a sensor type column 1132, and a signature column 1134) and a sensor type table 1128.

The search results table 1126 may be a graphical element comprising a table for indicating one or more sensor characteristic profiles found to match the selected sample sensor data and/or sample sensor data signature (e.g., selected via the sensor data signature input field 1112 and/or load button 1114 of the search parameters pane 1108). Each row of the search results table 1126 may correspond to one of the matching sensor characteristic profiles. On each of these rows, in the sensor type column 1132 the search results table 1126 may include sensor type information identifying the particular sensor type associated with the matching sensor characteristic profile corresponding to that row. Similarly, on each row, in the signature column 1134 the search results table 1126 may include sensor data and/or a sensor data signature that was determined to match the sample sensor data signature. The type selector column 1130 of the search results table 1126 includes on each row a selection box associated with the matching sensor characteristic profile corresponding to that row. In one example, selection of a selection box may cause a full set of sensor data and/or a full sensor data signature of the matching sensor characteristic profile corresponding to the selected box to be displayed in the sensor type table 1128.

Figure 12:
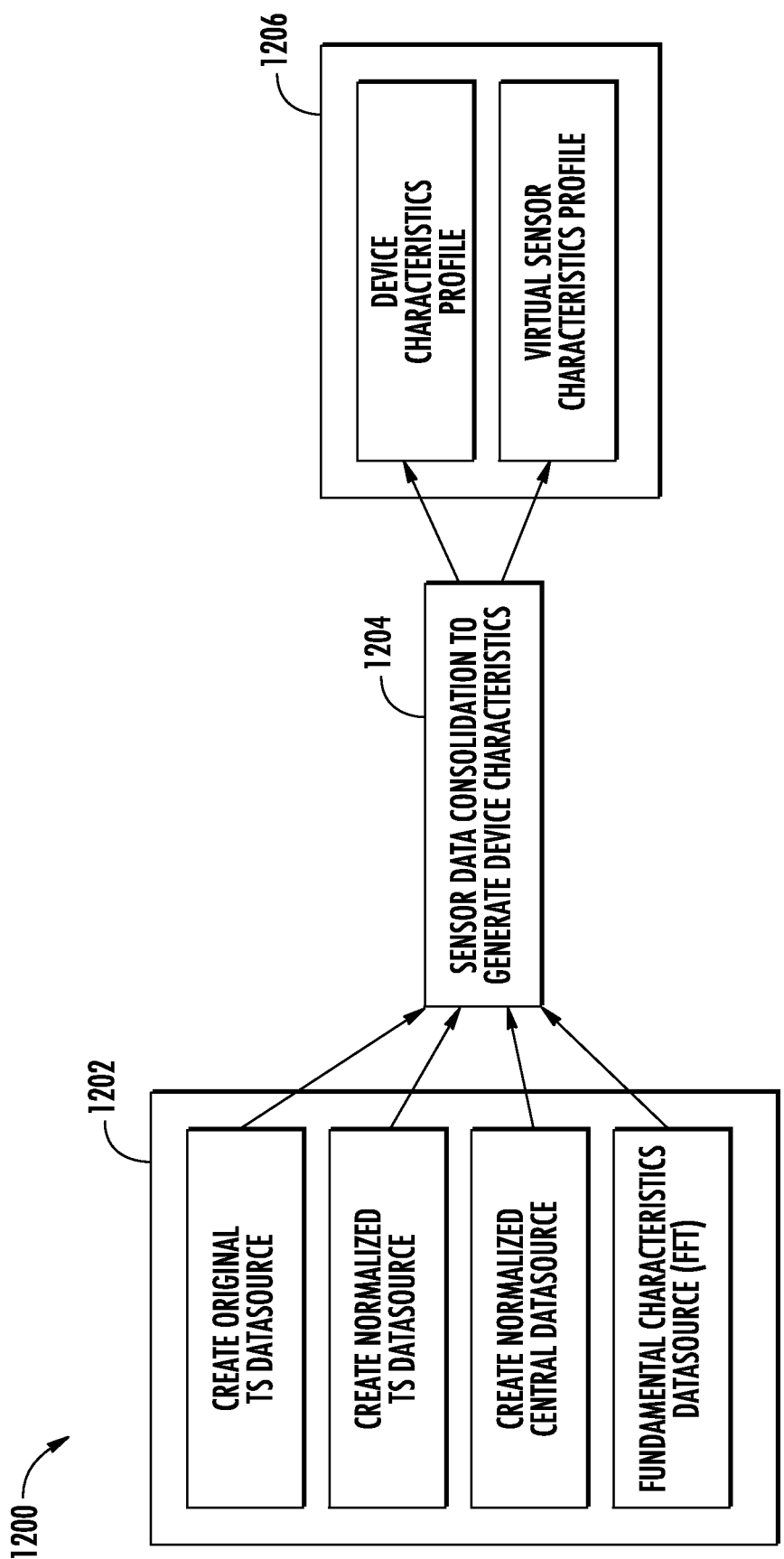
FIG. 12 illustrates a flowchart including operational blocks of example processes for sensor profiling, providing details about how device characteristic profiles and/or virtual sensor characteristic profiles may be generated according to some embodiments of the present disclosure.

FIG. 12 is an illustration of an example process for sensor profiling, in accordance with at least some example embodiments of the present disclosure. Specifically, FIG. 12 depicts steps or operations of an example process 1200 with reference to schematic depictions of example data objects used by and/or produced by the various steps or operations, providing additional details of how the device characteristic profiles and/or virtual sensor characteristic profiles may be generated and/or stored (e.g., as depicted and described with respect to steps/operations 306, 310, and/or 312 of the process 300).

At step/operation 1202 of the process 1200, a processor (such as, but not limited to, the processor 202 of the sensor profiling apparatus 200 described above in connection with FIG. 2), for each particular sensor type, generates and stores one or more sensor characteristic profiles for the particular sensor type (e.g., as depicted and described with respect to step/operation 304 and/or 312 of the process 300, steps/operations 604, 606, 608, 610, and/or 612 of the process 600, and/or step/operation 714 of the process 700). More particularly, as in step/operation 714 of the process 700, the processor may be configured to generate an original sensor characteristic profile, a normalized sensor characteristic profile, a (normalized) central sensor characteristic profile, and a fundamental sensor characteristic profile. In general, these variations of sensor characteristic profiles, for all sensor types, can be combined in various ways to generate the device characteristic profiles and/or the virtual sensor characteristic profiles.

Accordingly, at step/operation 1204 of the process 1200, a processor (such as, but not limited to, the processor 202 of the sensor profiling apparatus 200 described above in connection with FIG. 2) consolidates the various sensor characteristic profiles, including all variations for all sensor types to determine device characteristics for operational devices 104 to which the various sensors 106 represented in the sensor characteristic profiles are connected, to determine virtual sensor characteristics for virtual sensors and/or virtual sensor types defined with respect to particular combinations of the sensors 106, and/or to generate device characteristic information and/or virtual sensor characteristic information. The device characteristic information for a particular device type may be generated based at least in part on and/or comprise a combination of the sensor characteristic information indicated in the sensor characteristic profile for each sensor type indicated (e.g., within the context data) to be connected to the particular device type. Similarly, the virtual sensor characteristic information for a particular virtual sensor type may be generated based at least in part on and/or comprise a combination of the sensor characteristic information indicated in the sensor characteristic profile for each sensor type indicated (e.g., within the context data) to be included as part of the defined virtual sensor type. In general, the device characteristic information and/or the virtual sensor characteristic information resulting from the consolidation and combination of the different variations of sensor characteristic profiles for different sensor types can be used in generating the device characteristic profiles and/or virtual sensor characteristic profiles.

Accordingly, at step/operation 1206 of the process 1200, a processor (such as, but not limited to, the processor 202 of the sensor profiling apparatus 200 described above in connection with FIG. 2) generates and stores the device characteristic profiles and/or virtual sensor characteristic profiles. The processor may be configured to generate a device characteristic profile for each device type including the device characteristic information for that device type (e.g., as depicted and described with respect to step 306 of the process 300). The processor may be configured to generate a virtual sensor characteristic profile for each defined virtual sensor type including the virtual sensor characteristic information for that virtual sensor type (e.g., as depicted and described with respect to the step 310 of the process 300).

In this way, generating the sensor characteristic profiles for different sensor types enables generation of device characteristic profiles and/or virtual sensor characteristic profiles, which may be used to generate the sensor information similarly to how the sensor characteristic profiles are used.

Figure 13:
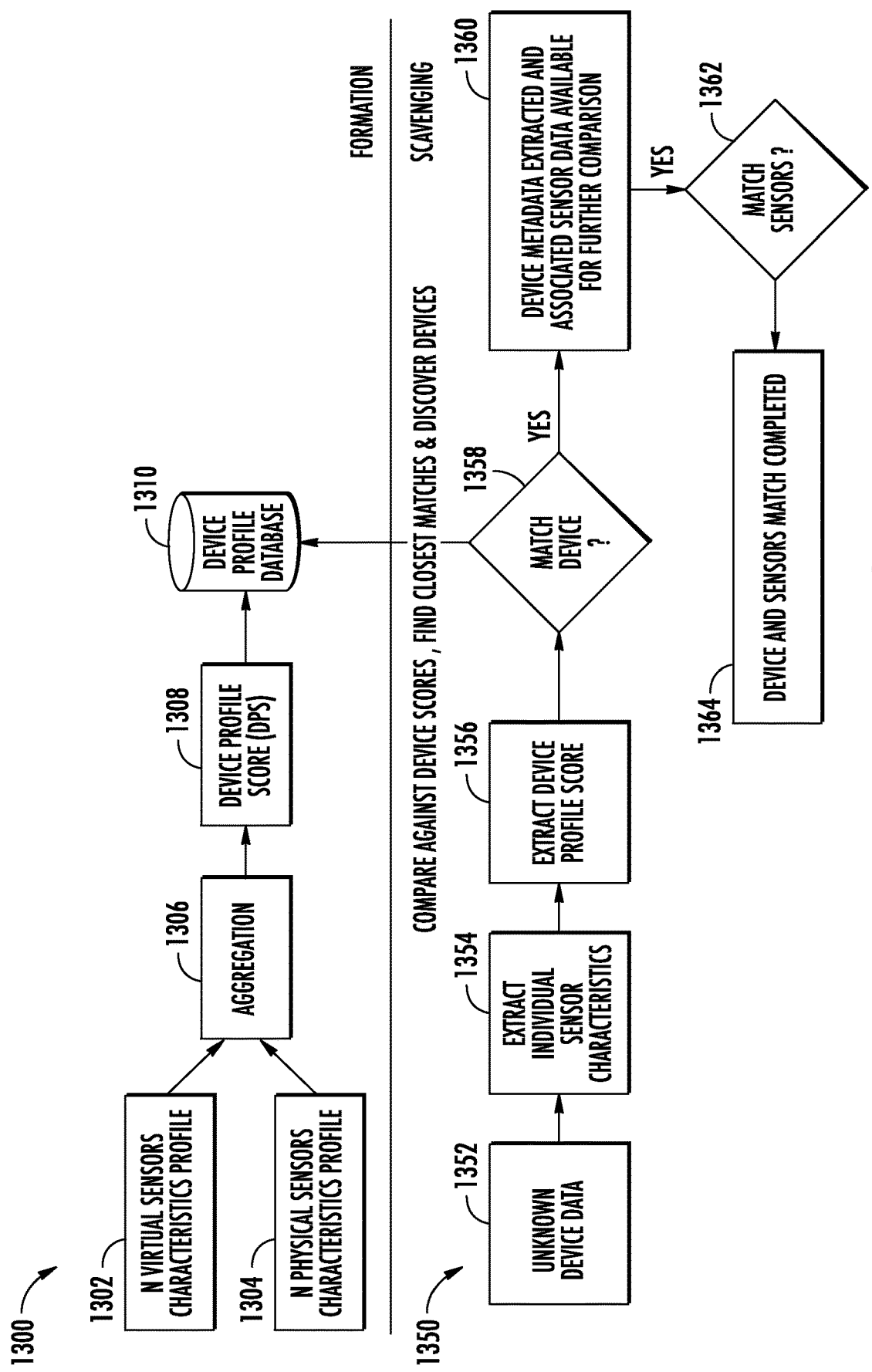
FIG. 13 illustrates a flowchart including operational blocks of example processes for sensor profiling, providing details about how device characteristic profiles may be generated and used to discover and/or identify unknown operational devices.

FIG. 13 is an illustration of example processes for sensor profiling, in accordance with at least some example embodiments of the present disclosure. Specifically, FIG. 13 depicts steps or operations of an example process 1300 and an example process 1350 with reference to schematic depictions of system components and/or example data objects used by and/or produced by the various steps or operations, providing additional details of how the device characteristic profiles may be generated and used to discover and/or identify unknown operational devices 104.

The process 1300 may correspond generally to steps/operations 306 and/or 312 of the process 300. For example, the steps/operations of the process 1300 may be examples of how steps/operations 306 and/or 312 may be performed.

At step/operation 1306 of the process 1300, a processor (such as, but not limited to, the processor 202 of the sensor profiling apparatus 200 described above in connection with FIG. 2) aggregates one or more virtual sensor characteristic profiles 1302 and/or one or more sensor characteristic profiles 1304, for example, by retrieving the one or more virtual sensor characteristic profiles 1302 and/or the one or more sensor characteristic profiles 1304 from a data repository (e.g., sensor profile database). The aggregated virtual sensor characteristic profiles 1302 may be a selected subset of the virtual sensor characteristic profiles generated and stored in step/operation 310 and 312 of the process 300 and/or those generated and stored in step/operation 1206 of the process 1200, for example. Similarly, the aggregated sensor characteristic profiles 1304 may be a selected subset of the sensor characteristic profiles generated and stored in steps/operations 304 and 312 of the process 300, steps/operations 604, 606, 608, 610, and 612 of the process 600, steps/operations 714 and 716 of the process 700, and/or step/operation 1202 of the process 1200, for example. The selected subset of the sensor characteristic profiles and/or virtual sensor characteristic profiles aggregated in step/operation 1306 may correspond to sensor types and/or virtual sensor types designated as being associated with (e.g., connected to) operational devices 104 of a particular type (e.g., as defined in stored context data), and the aggregation step/operation may be performed for each particular device type. For example, in step/operation 1306, the processor may be configured to, for each particular device type of operational devices 104, retrieve any stored virtual sensor characteristic profiles 1302 and/or sensor characteristic profiles 1304 for sensor types and/or virtual sensor types that are indicated (e.g., in the context data) to be associated with the particular device type, for example, by virtue of sensors 106 of the sensor types and/or combinations of sensors 106 defined as virtual sensors of the virtual sensor types normally being connected to operational devices 104 of the particular device type.

At step/operation 1308 of the process 1300, a processor (such as, but not limited to, the processor 202 of the sensor profiling apparatus 200 described above in connection with FIG. 2) generates a device profile score for each particular device type based at least in part on the virtual sensor characteristic profiles 1302 and/or the sensor characteristic profiles 1304 aggregated in step/operation 1306 for the particular device type and stores the generated device profile scores in a device profile database 1310. The processor may be configured to generate the device profile score in the manner defined and described with respect to step/operation 306 of the process 300. For example, the processor may be configured to generate the device profile score for the particular device type by combining and/or averaging sensor values indicated in the sensor data and/or sensor data signatures of the aggregated virtual sensor characteristic profiles 1304 and/or sensor characteristic profiles 1302. The processor may generate for each particular device type a device characteristic profile including the device profile score calculated for the particular device type and store the device characteristic profile in the device profile database 1310.

The process 1350 concerns how the device profile scores (e.g., of the device characteristic profiles) generated and stored in the process 1300 may be used, for example, to discover and/or identify unknown operational devices 104.

At step/operation 1352 of the process 1350, a processor (such as, but not limited to, the processor 202 of the sensor profiling apparatus 200 described above in connection with FIG. 2) receives device data from an unknown operational device 104. For example, the unknown operational device 104 may be a device for which context data providing identifying information about the device 104 and/or information about relationships of the device 104 to other components of the operational system 150 is not available. The device data received from the unknown operational device 104 may comprise sample sensor data from particular sensors 106 connected to the unknown operational device 104.

At step/operation 1354 of the process 1350, a processor (such as, but not limited to, the processor 202 of the sensor profiling apparatus 200 described above in connection with FIG. 2), for each individual sensor 106 represented in sample sensor data of the device data received from the unknown operational device 104, generates and/or extracts sensor characteristic information for the individual sensor 106, including, for example, a sample sensor data signature corresponding to the individual sensor 106. The sample sensor data signature for each individual sensor 106 represented in the device data from the unknown operational device 104 may be generated in the manner defined and described with respect to step/operation 404 of the process 400, steps/operations 904 and 906 of the process 900, and/or step/operation 1006 of the process 1000.

At step/operation 1356 of the process 1350, a processor (such as, but not limited to, the processor 202 of the sensor profiling apparatus 200 described above in connection with FIG. 2) generates a sample device profile score for the unknown operational device 104 based at least in part on the sensor characteristic information (e.g., the sample sensor data signatures) generated in step/operation 1354 for each individual sensor 106 represented in the device data from the unknown operational device 104. The sample device profile score for the unknown operational device 104 may be generated in the manner defined and described with respect to step/operation 1308 of the process 1300, but instead of using previously generated sensor data signatures of stored sensor characteristic profiles, the processor may generate the sample device profile score using the sample sensor data signatures generated in step/operation 1354 from the sample sensor data included in the device data received for the unknown operational device 104.

At step/operation 1358 of the process 1300, a processor (such as, but not limited to, the processor 202 of the sensor profiling apparatus 200 described above in connection with FIG. 2) compares the sample device profile score generated in step/operation 1356 to the device profile scores of the device characteristic profiles stored in the device profile database 1310. The processor may be configured to return one or more device characteristic profiles having device profile scores matching the sample device profile score within a predetermined matching threshold. In one example, the processor may return only the one or more device characteristic profiles having device profile scores that most closely match the sample device profile score (e.g., relative to the other device profile scores of the stored device characteristic profiles). In another example, the processor may return any device characteristic profiles having device profile scores that match the sample device profile score within the predetermined matching threshold.

At step/operation 1360 of the process 1300, a processor (such as, but not limited to, the processor 202 of the sensor profiling apparatus 200 described above in connection with FIG. 2), for each of the matching device characteristic profiles returned in step/operation 1358, determines and/or extracts device metadata for a matching device type of the matching device characteristic profile, including, for example, an indication of sensor types associated with the matching device type. For example, the processor may be configured to extract device type information from the matching device characteristic profile and determine (e.g., from stored context data) sensor type information for each sensor type indicated to be associated with the device type identified by the device type information extracted from the matching device characteristic profile.

At step/operation 1362 of the process 1300, a processor (such as, but not limited to, the processor 202 of the sensor profiling apparatus 200 described above in connection with FIG. 2) compares the sample sensor data signature for each individual sensor 106 represented in the device data from the unknown operational device 104 (e.g., generated in step/operation 1354) to sensor data signatures of the stored one or more sensor characteristic profiles for each sensor type indicated to be associated with the device type identified by the device type information extracted from each matching device characteristic profile. The processor may be configured to compare the sample sensor data signatures to the stored sensor data signatures in the manner defined and described with respect to steps/operations 908, 910, and/or 912 of the process 900 and/or step/operation 1010 of the process 1000, but instead of comparing the sample sensor data signatures to each of the stored sensor data signatures, the processor may perform the comparison only with respect to the stored sensor data signatures for each sensor type indicated to be associated with the device type identified by the device type information extracted from each matching device characteristic profile. This step/operation may be repeated for each matching device characteristic profile returned in step/operation 1358.

The processor may be configured to determine whether the sample sensor data signatures match the stored sample data signatures in a manner similar to that defined and described with respect to step/operation 912 and 914 of the process 900. In one example, the processor may be configured to determine that a match has been found between a sample sensor data signature and one of the stored sensor data signatures in response to determining that a match score determined for the sample sensor data signature and the stored sensor data signature is within a predetermined matching threshold. Moreover, the processor may be configured to determine whether the sample sensor data signatures generated in step/operation 1354, as a set, match the sensor types associated with the matching device characteristic profile based at least in part on predetermined matching criteria such as a predetermined threshold for a proportion of the set or quantity of signatures in the set of sample sensor data signatures determined to match a corresponding sensor type of the set of sensor types associated with the matching device characteristic profile. Based at least in part on the matching results for the individual sensors 106 (e.g., between the sample sensor data signatures and stored sensor data signatures), the processor may be configured to select one of the matching device characteristic profiles as an optimal match for the unknown operational device 104.

At step/operation 1364 of the process 1300, a processor (such as, but not limited to, the processor 202 of the sensor profiling apparatus 200 described above in connection with FIG. 2) completes the matching process for the devices 104 and the sensors 106, for example, by generating, deriving, storing, and/or updating context data for the unknown operational device 104 based at least in part on a selected matching device characteristic profile (e.g., determined to be an optimal match for the unknown operational device 104). In one example, the processor may derive device type information from the matching device characteristic profile and assign the derived device type information to the unknown operational device 104 (e.g., by associating the derived device type information with device identification information associated with the unknown operational device 104 in the stored context data). In another example, the processor may define a newly discovered device type by designating a particular combination of sensor types for the newly discovered device type based at least in part on the matching results for the individual sensors 106 determined in step/operation 1362.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An apparatus comprising at least one processor and at least one non-transitory memory comprising program code, wherein the at least one non-transitory memory and the program code are configured to, with the at least one processor, cause the apparatus to at least:
   receive aggregated time series sensor data and context data for a plurality of sensors of a plurality of different sensor types;
   generate one or more sensor characteristic profiles for each sensor type of the plurality of different sensor types based at least in part on the aggregated time series sensor data and the context data, wherein each of the one or more sensor characteristic profiles comprises sensor type information identifying the sensor type and a sensor data signature for the sensor type;
   store the one or more sensor characteristic profiles for each sensor type in a sensor type profile database;
   identify a first sensor type and a second sensor type of the plurality of different sensor types, wherein the first sensor type and the second sensor type being of similar sensor types and different sensor makes;
   retrieve sensor characteristic profiles of the first sensor type and the second sensor type from the stored one or more sensor characteristic profiles;
   compare the retrieved sensor characteristic profiles of the first sensor type and the second sensor type;
   evaluate the retrieved sensor characteristic profiles of the first sensor type and the second senor type based on a result of the comparison; and
   generate sensor information based at least in part on the evaluation of the retrieved sensor characteristic profiles.

2. The apparatus of claim 1, wherein the sensor information includes sensor identification information, sensor type information, and/or context data for a particular sensor.

3. The apparatus of claim 2, wherein the apparatus is further configured to determine the sensor identification information, sensor type information, and/or context data for the particular sensor based at least in part on sample sensor data from the particular sensor and the stored one or more sensor characteristic profiles.

4. The apparatus of claim 3, wherein the apparatus is further configured to determine the sensor identification information, sensor type information, and/or context data for the particular sensor by generating a sample sensor data signature for the particular sensor based at least in part on the sample sensor data from the particular sensor and matching the sample sensor data signature against sensor data signatures of the stored one or more sensor characteristic profiles.

5. The apparatus of claim 1, wherein the apparatus is further configured to generate the sensor information based at least in part on comparing sensor data signatures of the stored one or more sensor characteristic profiles, the compared sensor data signatures being for the similar sensor types of the different sensor makes, and evaluating the compared sensor data signatures against each other.

6. The apparatus of claim 1, wherein the apparatus is further configured to generate device characteristic profiles for a plurality of devices to which the plurality of sensors are connected based at least in part on the one or more sensor characteristic profiles, the device characteristic profiles comprising device type information identifying a device type and a device profile score for the device type.

7. The apparatus of claim 1, wherein the one or more sensor characteristic profiles for each sensor type include one or more normalized profiles, and the apparatus is further configured to generate the one or more normalized profiles by converting different instances of time series sensor data for different sensors to a common index system.

8. The apparatus of claim 1, wherein the one or more sensor characteristic profiles for each sensor type include one or more central sensor characteristic profiles, and the apparatus is further configured to generate a central characteristic profile by identifying a time window within which sensor data for sensors of the sensor type is sufficiently representative of the sensor type, extracting sensor data within the identified time window for sensors of the sensor type, and generating the sensor data signature of the central characteristic profile with respect to the extracted sensor data from within the identified time window.

9. The apparatus of claim 1, wherein the apparatus is further configured to generate one or more virtual sensor characteristic profiles for one or more virtual sensor types, each of which is defined with respect to a particular combination of different sensor types of the plurality of sensor types, by combining the sensor data signatures of the sensor characteristic profiles for the particular combination of different sensor types.

10. The apparatus of claim 1, wherein the sensor information includes comparison information for different sensor types of the plurality of sensor types and/or evaluation information indicating performance of a sensor type of the plurality of sensor types.

11. The apparatus of claim 10, wherein the comparison information indicates similarities and differences in at least one of functionalities and characteristic between the first sensor type and the second sensor type, and the evaluation information indicates comparative performance between the first sensor type and the second sensor type.

12. A method comprising:
at a device with one or more processors and one or more memories:
receiving aggregated time series sensor data and context data for a plurality of sensors of a plurality of different sensor types;
generating one or more sensor characteristic profiles for each sensor type of the plurality of different sensor types based at least in part on the aggregated time series sensor data and the context data, wherein each of the one or more sensor characteristic profiles comprises sensor type information identifying the sensor type and a sensor data signature for the sensor type;
storing the one or more sensor characteristic profiles for each sensor type in a sensor type profile database;
identifying a first sensor type and a second sensor type of the plurality of different sensor types, wherein the first sensor type and the second sensor type being of similar sensor types and different sensor makes;
retrieving sensor characteristic profiles of the first sensor type and the second sensor type from the stored one or more sensor characteristic profiles;
comparing the retrieved sensor characteristic profiles of the first sensor type and the second sensor type;
evaluating the retrieved sensor characteristic profiles of the first sensor type and the second sensor type based on a result of the comparison; and
generating sensor information based at least in part on the evaluation of the retrieved sensor characteristic profiles.

13. The method of claim 12, wherein the sensor information includes sensor identification information, sensor type information, and/or context data for a particular sensor.

14. The method of claim 13, further comprising determining the sensor identification information, sensor type information, and/or context data for the particular sensor based at least in part on sample sensor data from the particular sensor and the stored one or more sensor characteristic profiles.

15. The method of claim 14, further comprising determining the sensor identification information, sensor type information, and/or context data for the particular sensor by generating a sample sensor data signature for the particular sensor based at least in part on the sample sensor data from the particular sensor and matching the sample sensor data signature against sensor data signatures of the stored one or more sensor characteristic profiles.

16. The method of claim 12, further comprising generating the sensor information based at least in part on comparing sensor data signatures of the stored one or more sensor characteristic profiles, the compared sensor data signatures being for the similar sensor types of the different sensor makes, and evaluating the compared sensor data signatures against each other.

17. The method of claim 12, further comprising generating device characteristic profiles for a plurality of devices to which the plurality of sensors are connected based at least in part on the one or more sensor characteristic profiles, the device characteristic profiles comprising device type information identifying a device type and a device profile score for the device type.

18. The method of claim 12, wherein the one or more sensor characteristic profiles for each sensor type include one or more normalized profiles, and the method further comprises generating the one or more normalized profiles by converting different instances of time series sensor data for different sensors to a common index system.

19. The method of claim 12, wherein the one or more sensor characteristic profiles for each sensor type include one or more central sensor characteristic profiles, and the method further comprises generating a central characteristic profile by identifying a time window within which sensor data for sensors of the sensor type is sufficiently representative of the sensor type, extracting sensor data within the identified time window for sensors of the sensor type, and generating the sensor data signature of the central characteristic profile with respect to the extracted sensor data from within the identified time window.

20. The method of claim 12, further comprising generating one or more virtual sensor characteristic profiles for one or more virtual sensor types, each of which is defined with respect to a particular combination of different sensor types of the plurality of sensor types, by combining the sensor data signatures of the sensor characteristic profiles for the particular combination of different sensor types.

21. A computer program product comprising at least one non-transitory computer-readable storage medium having computer-readable program code portions stored therein, the computer-readable program code portions comprising an executable portion configured to:
receive aggregated time series sensor data and context data for a plurality of sensors of a plurality of different sensor types;

generate one or more sensor characteristic profiles for each sensor type of the plurality of different sensor types based at least in part on the aggregated time series sensor data and the context data, wherein each of the one or more sensor characteristic profiles comprises sensor type information identifying the sensor type and a sensor data signature for the sensor type;

store the one or more sensor characteristic profiles for each sensor type in a sensor type profile database;

identify a first sensor type and a second sensor type of the plurality of different sensor types, wherein the first sensor type and the second sensor type being of similar sensor types and different sensor makes;

retrieve sensor characteristic profiles of the first sensor type and the second sensor type from the stored one or more sensor characteristic profiles;

compare the retrieved sensor characteristic profiles of the first sensor type and the second sensor type;

evaluate the retrieved sensor characteristic profiles of the first sensor type and the second sensor type based on a result of the comparison; and generate sensor information based at least in part on the evaluation of the retrieved sensor characteristic profiles.

* * * * *